(12) United States Patent
Takayama

(10) Patent No.: US 8,392,724 B2
(45) Date of Patent: Mar. 5, 2013

(54) INFORMATION TERMINAL, SECURITY DEVICE, DATA PROTECTION METHOD, AND DATA PROTECTION PROGRAM

(75) Inventor: Hisashi Takayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1013 days.

(21) Appl. No.: 12/376,195

(22) PCT Filed: Dec. 26, 2007

(86) PCT No.: PCT/JP2007/074914
§ 371 (c)(1),
(2), (4) Date: Mar. 27, 2009

(87) PCT Pub. No.: WO2008/081801
PCT Pub. Date: Jul. 10, 2008

(65) Prior Publication Data
US 2010/0011225 A1   Jan. 14, 2010

(30) Foreign Application Priority Data
Dec. 27, 2006   (JP) .................................. 2006-353093

(51) Int. Cl.
*G06F 21/00* (2006.01)
(52) U.S. Cl. .......................... 713/189; 713/187; 717/168
(58) Field of Classification Search ........................ None
See application file for complete search history.

(56) References Cited

U.S. PATENT DOCUMENTS

| | | |
|---|---|---|
| 6,988,250 B1 | 1/2006 | Proudler et al. |
| 7,069,439 B1 | 6/2006 | Chen et al. |
| 7,236,455 B1 | 6/2007 | Proudler et al. |
| 7,430,668 B1 | 9/2008 | Chen et al. |

(Continued)

FOREIGN PATENT DOCUMENTS

| | | |
|---|---|---|
| JP | 2001-337864 | 12/2001 |
| JP | 2002-536757 | 10/2002 |

(Continued)

OTHER PUBLICATIONS

International Search Report issued Apr. 15, 2008 in the International (PCT) Application of which the present application is the U.S. National Stage.

(Continued)

*Primary Examiner* — Hadi Armouche
*Assistant Examiner* — Malcolm Cribbs
(74) *Attorney, Agent, or Firm* — Wenderoth, Lind & Ponack, L.L.P.

(57) ABSTRACT

An information terminal that decrypts sealed data without returning program data after update to the state before update. The information terminal includes update certificate storage unit storing an update certificate for certifying update of the program data to be executed by CPU, and a selection unit which, when the CPU is to execute program data, judges whether or not digest of the post-update program data in the update certificate matches digest of the program data to be executed, and selects digest of the pre-update program data in the update certificate when it judges that they match. The CPU executes the post-update program data. The information terminal further includes a security device that stores an extend value of a program data digest when the pre-update program data is executed by the CPU according to a request from the selection unit.

7 Claims, 24 Drawing Sheets

U.S. PATENT DOCUMENTS

| | | | |
|---|---|---|---|
| 7,444,601 B2 | 10/2008 | Proudler et al. | |
| 2001/0025311 A1 | 9/2001 | Arai et al. | |
| 2003/0149872 A1* | 8/2003 | Harrison et al. | 713/155 |
| 2005/0021968 A1 | 1/2005 | Zimmer et al. | |
| 2005/0132350 A1* | 6/2005 | Markley et al. | 717/168 |
| 2005/0144141 A1 | 6/2005 | Nagao | |
| 2006/0225068 A1* | 10/2006 | Bennett et al. | 717/168 |
| 2008/0077801 A1* | 3/2008 | Ekberg | 713/187 |

FOREIGN PATENT DOCUMENTS

| | | |
|---|---|---|
| JP | 2005-141413 | 6/2005 |

OTHER PUBLICATIONS

"TCG Mobile Reference Architecture," TCG Published, Jun. 2007.

"TCG Mobile Trusted Module Specification (Version 1.0)," TCG Published, Jun. 2007.

"Trusted Computing Platform Alliance," Trusted Computing Group, 2003.

"TCG Mobile Trusted Module Specification (Version 0.9) Draft," TCG Published, Sep. 2006.

* cited by examiner

| Program data ID information | Program data version | Program data |
|---|---|---|
| 0001 | V1.52 | Movie player |
| 0002 | V5.1 | Mailer |
| 0006 | V2.12 | Word processor |
| ⋮ | ⋮ | ⋮ |

| Program data configuration ID information | Reference value |
|---|---|
| 0001 | XXZ08549 |
| 0002 | 28QP5368 |
| 0006 | A6832QLZ |
| ⋮ | ⋮ |

FIG. 24A

Program data configuration ID information 2401

| New configuration version | | | |
|---|---|---|---|
| BIOS ID information | BIOS version number | | |
| OS ID information | OS version number | | |
| Application ID information | Application version number | | |

New configuration extend value

| Old configuration version | | | |
|---|---|---|---|
| BIOS ID information | BIOS version number | | |
| OS ID information | OS version number | | |
| Application ID information | Application version number | | |

Old configuration extend value

Provider ID information

Provider signature

FIG. 24B

Program data configuration ID information 2402

New N-generation version

New N-generation extend value (N-1)-generation version (N-1)-generation extend value

...

(N-i)-generation version (N-i)-generation extend value

Provider ID information

Provider signature

INFORMATION TERMINAL, SECURITY DEVICE, DATA PROTECTION METHOD, AND DATA PROTECTION PROGRAM

TECHNICAL FIELD

The present invention relates to an information terminal which is usable as an information communication device such as a personal computer and a mobile telephone, and is usable as a home electric appliance such as a television receiver having a function to access the Internet, and relates to a security device embedded in the information terminal, and especially relates to a technology of enabling the authentication process and the decryption process to be performed even after the program data is updated, where in the authentication process, the program data executed in the information terminal is authenticated, and in the decryption process, the encrypted data, that has been encrypted bound with the program data executed in the information terminal, is decrypted

BACKGROUND ART

In recent years, varieties of services have become available via networks. The services include works of music or video, browsing the confidential information held by corporations, and on-linebanking. The economical values of the information treated in the services have increased, as well. To deal with such varieties of services, information terminals such as personal computers, mobile telephones, and digital home electric appliances are installed with many pieces of client software (program data). Also, the program data is implemented with a function to protect the high-value information, as well as with a function to receive the services.

As the services have come to provide contents with higher values, improper acts causing damages have increased. For example, the restriction imposed by the software is bypassed by changing, in an unauthorized manner, the program data that is executed on the information terminal. As a result, it has become increasingly necessary to verify, regarding the personal computer to which a service is to be provided, whether or not the client software of the personal computer and the execution environment including the operating system have not been changed in an unauthorized manner.

As one example of technologies developed to meet the above-described needs, a technology of accurately conveying information on the program data executed on the personal computer has been proposed by the TCG (Trusted Computing Group).

FIG. 16 shows an example of a system in which, based on the technology proposed by the TCG, a personal computer 1600 holds data that has been encrypted for protection, and a service providing server 1610 authenticate the program data executed on the personal computer 1600 and provides an information service thereto. The personal computer 1600 is implemented with a tamper-resistant module that is called TPM (Trusted Platform Module) 1602.

When a BIOS 1605, an OS 1606, an application 1607, or a code of the program data is to be executed, a CPU 1601 of the personal computer 1600 calculates a hash of it, and transmits the calculated hash to the TPM 1602. Upon receiving the hash, the TPM 1602 concatenates the received hash with a hash prestored in a PCR (Platform Configuration Register) 1604, further performs a hash calculation onto concatenated data resulted from the concatenation, and stores the result into the PCR 1604. In this way, the PCR 1604 stores extend information of the program data executed by the CPU 1601. The value stored in the PCR 1604 thus indicates which piece of program data is being executed on the personal computer 1600.

When the personal computer 1600 is to hold a certain piece of data safely as confidential data, the TPM 1602 obtains encrypted data by encrypting the certain piece of data by binding it with the value stored in the PCR 1604 of the TPM 1602, and stores the obtained encrypted data on to a hard disk 1603. More specifically, the TPM 1602 encrypts the data in a format that includes a PCR value as a reference value which is to be used in the decryption, where the PCR value to be included is a PCR value when the CPU 1601 is actually executing authentic program data that is expected to be executed by the CPU 1601 of the personal computer 1600 in the case where the data is to be browsed or processed on the personal computer 1600. In the encryption, a public key in the public key cryptography is used, and the private key corresponding to the public key is managed by the TPM 1602.

Encrypting data by binding it with the value stored in the PCR 1604 of the TPM 1602, as described above, is called sealing. Conversely, decrypting the sealed encrypted data 1608 is called unsealing.

When decrypting the sealed data 1608, first, the TPM 1602 decrypts the encryption of the sealed data 1608 by using the private key corresponding to the public key that was used in the encryption. Next, the TPM 1602 compares the reference value included in the decrypted data with the value (PCR value) stored in the PCR 1604. When, by the comparison, it is confirmed that they match, the TPM 1602 authenticate that authentic program data is executed on the personal computer 1600, and then outputs the decrypted data from the TPM 1602 to the CPU 1601. When, by the comparison, it is confirmed that they do not match, the TPM 1602 does not authenticate that authentic program data is executed on the personal computer 1600, and does not output the decrypted data from the TPM 1602 to outside.

When the personal computer 1600 is to receive an information service provided from the service providing server 1610, the personal computer 1600 transmits data 1620 to the service providing server 1610, where the data 1620 is generated by the TPM 1602 by applying an electronic signature to the value (PCR value) stored in the PCR 1604. Here, the data 1620, which is generated by applying an electronic signature to the value (PCR value 1620a) stored in the PCR 1604, is generated by the TPM 1602, in accordance with a request from the CPU 1601, by applying a signature to data that was generated by concatenating the value (PCR value 1620a) stored in the PCR 1604 with challenge information 1620b (for example, a random number generated by the service providing server 1610) received from a client authentication unit 1611 of the service providing server 1610.

A reference value DB (database) 1612 of the service providing server 1610 stores a PCR value (PCR reference value) in the case when the CPU 1601 of the personal computer 1600 is actually executing authentic program data that is expected by the service providing server 1610 side. First, the client authentication unit 1611 of the service providing server 1610 verifies the electronic signature applied to the data 1620 received from the personal computer 1600. Next, the client authentication unit 1611 compares the PCR value 1620a included in the data 1620 with the PCR reference value stored in the reference value DB 1612, and further compares the challenge information 1620b included in the data 1620 with the challenge information 1620b that was transmitted to the personal computer 1600. When it is confirmed that they match in each of the comparisons, the client authentication unit 1611 authenticate that authentic program data is being executed on the personal computer 1600, and a service providing unit 1613 of the service providing server 1610 provides the information service to the personal computer 1600. On the other hand, when it is confirmed that they do not match in any of the comparisons, the service providing unit 1613 of the service providing server 1610 does not provide the information service to the personal computer 1600.

The above-described technology proposed by the TCG is, for example, disclosed in Patent Document 1 and Patent Document 2 which are identified as follows.

Patent Document 1: U.S. Patent Publication No. 2005/0021968

Patent Document 2: Tokuhyo (published Japanese translation of PCT international publication for patent application) No. 2002-536757

SUMMARY OF THE INVENTION

The Problems the Invention is Going to Solve

However, the technology proposed by the TCG has a problem that, when the program data is updated for the purpose of version-upgrade, bag patch, or overcoming the vulnerability, the TPM 1602 cannot decrypt the data sealed bound with the value stored in the PCR 1604 before the update.

Also, the technology has another problem that, when the PCR reference value stored in the reference value DB 1612 of the service providing server 1610 has not been updated in correspondence with the update of the program data, the personal computer 1600 cannot receive the provided information service. A possible solution to these problems would be to decrypt the sealed data or enable the information service to be received from the service providing server 1610 by provisionally returning the program data to the program data before the update. However, this method has a safety deficiency because it returns the program data to the state where it has bugs or vulnerability.

An object of the present invention is therefore to provide a security device and an information terminal that can decrypt the sealed data without returning the program data after update to the state before update and can receive an information service from a service providing server that authenticate the program data executed by the CPU.

Means to Solve the Problems

The above-described object of the present invention is fulfilled by an information terminal for executing a program, comprising: an update certificate obtaining unit operable to obtain an update certificate including an old characteristic value and a new characteristic value, the old characteristic value indicating a characteristic of an old program, the new characteristic value indicating a characteristic of a new program that is obtained by updating the old program; a holding unit operable to hold data and a past characteristic value in association with each other, the past characteristic value indicating a characteristic of a past program, the past program being a program that used the data in past; a judging unit operable to judge, using the new characteristic value, whether or not a current program matches the new program, the current program being a program that is currently executed in the information terminal; and a permission unit operable to judge, in accordance with the old characteristic value and the past characteristic value, whether or not the data can be used when the judging unit judges that the current program matches the new program, and permit the current program to use the data when judging that the data can be used.

Effects of the Invention

With the above-described structure of the information terminal of the present invention, when it is an information terminal that restricts the use of data by using the characteristic value of the program, even if a program is updated between a start of use restriction of the data and a start of data use, the program after update can use the data as before the update. On the other hand, conventionally, the program before update (old program) and the program after update (new program) have different characteristic values. With the conventional structure, the new program cannot use the data that is restricted from use based on the characteristic value of the old program. However, the present invention removes the data use restriction by using the characteristic value of the old program (old characteristic value) included in the update certificate, and the new program is also able to use the data as before the update. Furthermore, removing the data use restriction by using the old characteristic value is performed after it is confirmed that the program being executed on the information terminal is the new program. Accordingly, the present invention can remove the use restriction after it confirms that the program that is currently running on the information terminal has been updated normally.

In the above-stated information terminal, the new characteristic value may be a digest of the new program, and the judging unit includes: a digest generating sub-unit operable to generate a digest of the current program; and a determining sub-unit operable to determine that the current program matches the new program when the digest of the current program matches the digest of the new program.

With the above-described structure, it is possible to permit the use of data after it is confirmed that, at the current point in time, the program has been updated normally and has not been tampered with.

In the above-stated information terminal, the old characteristic value may be a digest of the old program, the past characteristic value is a digest of the past program, the data is associated with a use condition value that is a value based on the digest of the past program, the digest generating sub-unit generates a digest of each of one or more programs that were executed in a predetermined order before the current program is executed, and the permission unit includes: an extend value generating sub-unit operable to generate a pre-update extend value by performing an extend calculation on each digest of the one or more programs and on the digest of the old program in the update certificate; an extend value judging sub-unit operable to judge whether or not the use condition value matches the pre-update extend value; and a use permission sub-unit operable to permit the current program to use the data when the extend value judging sub-unit judges that the use condition value matches the pre-update extend value.

With the above-described structure, it is possible to remove the use restriction by using the extend value obtained by performing an extend calculation onto the digest. This makes it possible to remove the use restriction after confirming the authenticity of the update-target program and also the authenticity of the execution environment of the program.

In the above-stated information terminal, the extend value generating sub-unit may generate the pre-update extend value when the judging unit judges that the current program matches the new program, and generate a current extend value by performing an extend calculation on each digest of the one or more programs and on the digest of the current program when the judging unit judges that the current program does not match the new program, the extend value judging sub-unit judges whether or not the use condition value matches the pre-update extend value when the judging unit judges that the current program matches the new program, and judges whether or not the use condition value matches the current extend value when the judging unit judges that the current program does not match the new program, and the use permission sub-unit permits the current program to use the data when the extend value judging sub-unit judges that the use condition value matches either the pre-update extend value or the current extend value.

In the above-stated information terminal, the extend value generating sub-unit may generate the pre-update extend value, and generates a current extend value by performing an extend calculation on each digest of the one or more programs and on the digest of the current program, and the use permission sub-unit judges whether or not the use condition value matches either the pre-update extend value or the current extend value, and permits the current program to use the data when the use permission sub-unit judges that the use condition value matches either the pre-update extend value or the current extend value.

With the above-described structure, even in the state where the program has been updated to the new program, and the characteristic value of the old program cannot be generated, it is possible to, using the old characteristic value included in the update certificate, generate an extend value that meets the aforesaid use condition value, permit the use of data using the extend value, and allow the program data after update to use the data as before the update.

In the above-stated information terminal, the extend value generating sub-unit may further generate a current extend value by performing an extend calculation on each digest of the one or more programs and on the digest of the current program, and when the permission unit judges that the data can be used, the permission unit further updates the use condition value, which is associated with the data, to the current extend value.

With the above-described structure, after the use condition value for the data is rewritten, the new program can use the data without using the old characteristic value of the old program.

In the above-stated information terminal, the data and the use condition value may have been encrypted before being held by the information terminal, and the permission unit further includes: a decryption sub-unit operable to decrypt the data and the use condition value before the judgment by the use permission sub-unit; and an encryption sub-unit operable to encrypt the data and the use condition value after the current program ends a use of the data.

With the above-described structure, it is possible to protect the data and the use condition value by encryption.

In the above-stated information terminal, the new characteristic value may be a post-update extend value that is generated by performing an extend calculation on the digest of the new program and on each digest of one or more programs that are executed in a predetermined order before the current program is executed in the information terminal, and the judging unit includes: a digest generating sub-unit operable to generate a digest of each of one or more programs that were executed in the predetermined order before the current program is executed, and generate a digest of the current program; an extend value generating sub-unit operable to generate a current extend value by performing an extend calculation on each digest generated by the digest generating sub-unit; and a determining sub-unit operable to determine that the current program matches the new program when the post-update extend value matches the current extend value.

With the above-described structure, it is possible to remove the use restriction after confirming the authenticity of the update-target program and also the authenticity of the execution environment of the program.

In the above-stated information terminal, the old characteristic value may be a pre-update extend value that is generated by performing an extend calculation on each digest of one or more programs that are executed in a predetermined order before the current program is executed in the information terminal, and on the digest of the old program, the past characteristic value is a past-update extend value that is generated by performing an extend calculation on each digest of the one or more programs that are executed in the predetermined order before the current program is executed in the information terminal, and on the digest of the past program, the data is associated with a use condition value that is a value equivalent with the past characteristic value, and the permission unit includes: an extend value judging sub-unit operable to, when the judging unit judges that the current program matches the new program, judge whether or not the use condition value matches the pre-update extend value; and a use permission sub-unit operable to permit the current program, which is currently executed, to use the data when the extend value judging sub-unit judges that the use condition value matches the pre-update extend value.

With the above-described structure, even in the state where the program has been updated to the new program, and the characteristic value of the old program cannot be generated, it is possible to, by obtaining the extend value meeting the use condition value from the update certificate that includes the pre-update extend value, allow the program data after update to use the data as before the update.

In the above-stated information terminal, the permission unit may further include a re-seal sub-unit operable to update the use condition value, which is associated with the data, to the current extend value generated by the extend value generating sub-unit when the use permission sub-unit permits the current program to use the data.

With the above-described structure, after the use condition value for the data is rewritten, the new program can use the data without using the old characteristic value of the old program.

In the above-stated information terminal which is used together with a service providing device that judges whether to provide service based on an authentication value, the authentication value being a characteristic value indicating a characteristic of a program, the service providing device may include: a storage unit storing a reference value being a characteristic value indicating a characteristic of a program; a receiving unit operable to receive an authentication value from the information terminal; and a providing unit operable to provide a service to the information terminal when the authentication value matches the reference value, and the information terminal further comprises a transmission unit operable to transmit, to the service providing device, an authentication value that indicates a characteristic of the current program, and when the service is not provided as a response to the transmission of the authentication value, transmit, to the service providing device, an authentication value that indicates a characteristic of the old program.

With the above-described structure of the information terminal, even if the program is updated from an old program to a new program, the program to use the data changes from the old program to the new program, and the characteristic value of the program to use the data changes from the old characteristic value to the new characteristic value, the new program can receive the service provided from the service providing device based on the old characteristic value included in the update certificate.

In the above-stated information terminal, the update certificate obtaining unit may include: a program obtaining sub-unit operable to obtain un update program that is used to update the new program; an update digest generating sub-unit operable to generate an update characteristic value that indicates a characteristic of the update program; and an update certificate updating sub-unit operable to rewrite the old characteristic value in the update certificate with the new characteristic value in the update certificate, and rewrite the new characteristic value in the update certificate with the update characteristic value generated by the update digest generating sub-unit.

With the above-described structure, the information terminal can generate and use the update certificate in the own terminal.

The above-described object of the present invention is also fulfilled by a security device for use in an information terminal for executing a program, the information terminal including: an update certificate obtaining unit operable to obtain an update certificate that includes a digest of an old program and a digest of a new program that is obtained by updating the old program; a holding unit operable to hold data and a use condition value, the use condition value being a value based on a digest of a past program, the past program being a program that used the data in past; a digest generating unit operable to generate a digest of each of one or more programs that were executed in a predetermined order before a current program, which is currently executed, is executed, and generate a digest of the current program; and a determining unit operable to determine that the current program matches the new program when the digest of the current program matches the digest of the new program, the security device comprising: an extend value generating unit operable to generate an extend value by performing an extend calculation on each digest of the one or more programs and on the digest of the old program in the update certificate when the determining unit determines that the current program matches the new program; an extend value judging unit operable to judge whether or not the use condition value matches the extend value generated by the extend value generating unit; and a use permission unit operable to permit the current program to use the data when the extend value judging unit judges that the use condition value matches the extend value.

With the above-described structure, generation of the extend values and judgment on whether or not the use of data should be permitted can be performed in a safer way.

The above-described object of the present invention is further fulfilled by a security device for use in an information terminal for executing a program, the information terminal including: an update certificate obtaining unit operable to obtain an update certificate including a pre-update extend value and a post-update extend value, where the pre-update extend value is generated by performing an extend calculation on the digest of an old program and on each digest of one or more programs that are executed in a predetermined order before a current program is executed in the information terminal, and the post-update extend value is generated by performing an extend calculation on the digest of a new program and on each digest of the one or more programs that are executed in the predetermined order before the current program is executed in the information terminal, the current program being a program currently executed, the new program being a program obtained by updating the old program; a holding unit operable to hold data and a use condition value in association with each other, the use condition value being a value based on a digest of a past program which is a program that used the data in past; a current extend value obtaining unit operable to obtain a current extend value from the security device; and a determining unit operable to determine that the current program matches the new program when the current extend value matches the post-update extend value, the security device comprising: an extend value generating unit operable to generate the current extend value by performing an extend calculation on each digest generated by the digest generating unit, and output the generated current extend value to the information terminal; an extend value judging unit operable to judge whether or not the use condition value matches the pre-update extend value when the determining unit determines that the current program matches the new program; and a use permission unit operable to permit the current program to use the data when the extend value judging unit judges that the use condition value matches the pre-update extend value.

The above-described object of the present invention is still further fulfilled by a data protection method for use in an information terminal for executing a program, the data protection method comprising the steps of: obtaining an update certificate including an old characteristic value and a new characteristic value, the old characteristic value indicating a characteristic of an old program, the new characteristic value indicating a characteristic of a new program that is obtained by updating the old program; holding data and a past characteristic value in association with each other, the past characteristic value indicating a characteristic of a past program, the past program being a program that used the data in past; judging, using the new characteristic value, whether or not a current program matches the new program, the current program being a program that is currently executed in the information terminal; and judging, in accordance with the old characteristic value and the past characteristic value, whether or not the data can be used when the judging step judges that the current program matches the new program, and permitting the current program to use the data when judging that the data can be used.

The above-described object of the present invention is further fulfilled by a data protection program for use in an information terminal for executing a program, the data protection program comprising the steps of: obtaining an update certificate including an old characteristic value and a new characteristic value, the old characteristic value indicating a characteristic of an old program, the new characteristic value indicating a characteristic of a new program that is obtained by updating the old program; holding data and a past characteristic value in association with each other, the past characteristic value indicating a characteristic of a past program, the past program being a program that used the data in past; judging, using the new characteristic value, whether or not a current program matches the new program, the current program being a program that is currently executed in the information terminal; and judging, in accordance with the old characteristic value and the past characteristic value, whether or not the data can be used when the judging step judges that the current program matches the new program, and permitting the current program to use the data when judging that the data can be used.

With the above-described structure, in an information terminal that restricts the use of data by using the characteristic value of the program, even if a program is updated between a start of data use restriction and a start of data use, the program after update can use the data as before the update. On the other hand, conventionally, the program before update (old program) and the program after update (new program) have different characteristic values. With the conventional structure, the new program cannot use the data that is restricted from use based on the characteristic value of the old program. However, the present invention removes the data use restriction by using the characteristic value of the old program (old characteristic value) included in the update certificate, and even the new program is able to use the data as before the update. Furthermore, removing the data use restriction by using the old characteristic value is performed after it is confirmed that the program being executed on the information terminal is the new program. Accordingly, the present invention can remove the use restriction after it confirms that the program that is currently running on the information terminal has been updated normally.

BRIEF DESCRIPTION OF THE DRAWING

FIG. 24A shows the contents of an update certificate including extend values of two generations in Embodiment 5 of the present invention.

FIG. 24B shows the contents of an update certificate including extend values of a plurality of generations in Embodiment 5 of the present invention.

Figure 1:
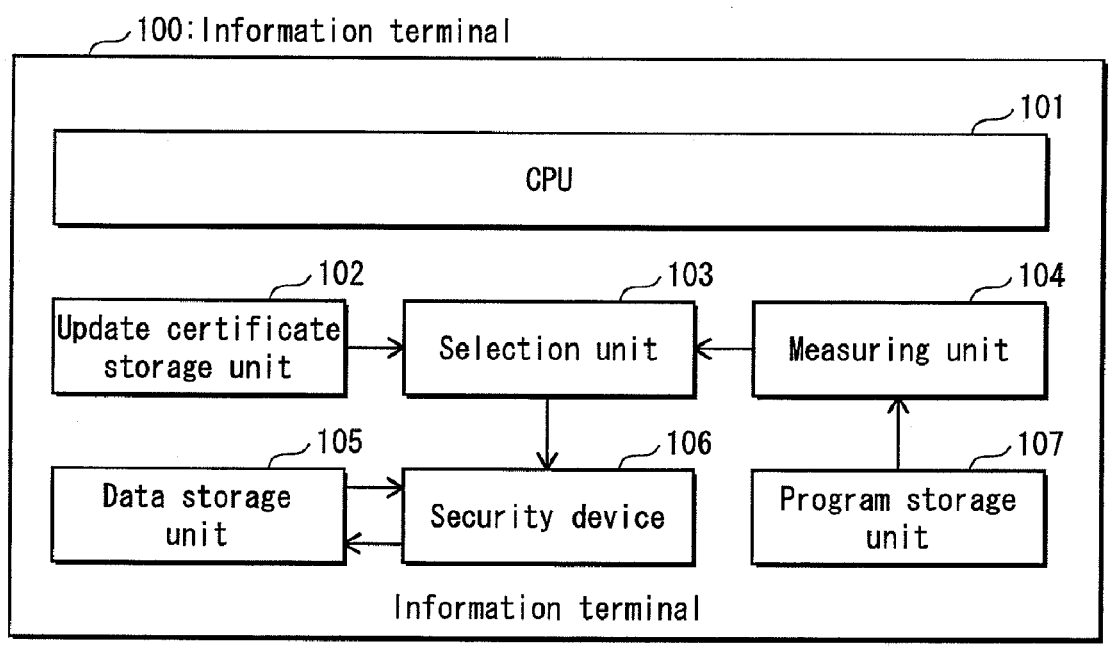
FIG. 1 is a block diagram showing the structure of the information terminal in Embodiment 1 of the present invention.

DESCRIPTION OF CHARACTERS 100, 700, 900, 1400 information terminal
101 CPU
102 update certificate storage unit
103, 703, 903, 1403 selection unit
104 measuring unit
105 data storage unit
106, 706, 906, 1406 security device
107 program storage unit
201 extend calculation unit
202 extend value storage unit
203 decryption unit
204 decryption condition verifying unit
205 signing unit
206 pre-update extend value storage unit
207 encryption unit
300, 350 update certificate
400 sealed data
1600 personal computer
1601 CPU
1602 TPM
1603 hard disk
1604 PCR
1605 BIOS
1606 OS
1607 application
1608 sealed data
1610 service providing server
1611 client authentication unit
1612 reference value DB
1613 service providing unit
1620 data
1620a PCR value
1620b challenge information

DETAILED DESCRIPTION OF THE INVENTION

In the following, several embodiments of the present invention will be described with reference to the attached drawings.

Embodiment 1

The structure of an information terminal 100 in Embodiment 1 of the present invention will be described.

FIG. 1 is a block diagram showing the structure of the information terminal 100 in Embodiment 1 of the present invention. The information terminal 100, as shown in FIG. 1, is composed of a CPU 101, an update certificate storage unit 102, a selection unit 103, a measuring unit 104, a data storage unit 105, a security device 106, and a program storage unit 107. The program storage unit 107 stores program data executed by the CPU 101. The update certificate storage unit 102 stores an update certificate for certifying an update of the program data. The measuring unit 104 generates a digest of the program data executed by the CPU 101. The security device 106 performs an extend calculation on a program data digest, and stores results of the calculation. The selection unit 103 selects a program data digest that is to be subjected to the extend calculation performed by the security device 106. The data storage unit 105 stores data that has been processed by the CPU 101 or the security device 106. Note that, more specifically, the program data digest is a result of a hash calculation such as SHA-1 (Secure Hash Algorithm 1) performed onto the program data. Hereinafter, the digest means a result of a hash calculation such as SHA-1. In connection with this, generating a digest means calculating (also referred to as "measuring") a hash value.

The selection unit 103 and the measuring unit 104 are achieved by software executed by the CPU 101 or dedicated hardware whose operation will be described later in detail.

The update certificate storage unit 102, the data storage unit 105, and the program storage unit 107 are specifically achieved by storage devices such as non-volatile memories or hard disks. The data storage unit 105 corresponds to the hard disk 1603 shown in FIG. 16.

The program storage unit 107 stores the updated program data (post-update program data, namely, program data after update) The update certificate storage unit 102 stores an update certificate that corresponds to the post-update program data stored in the program storage unit 107. The update certificate will be described later in detail. The update certificate is downloaded via a network when the program data is updated, or is loaded via a recording medium such as CD-ROM, and then is stored into the update certificate storage unit 102. Usually, the update certificate is loaded onto the information terminal 100 together with the post-update program data.

The data storage unit 105 stores sealed data that has been sealed bound with a result of an extend calculation performed on a program data digest stored in the security device 106. The sealed data stored in the data storage unit 105 includes sealed data that has been sealed bound with a result of an extend calculation performed on pre-update program data (program data before update).

Figure 2:
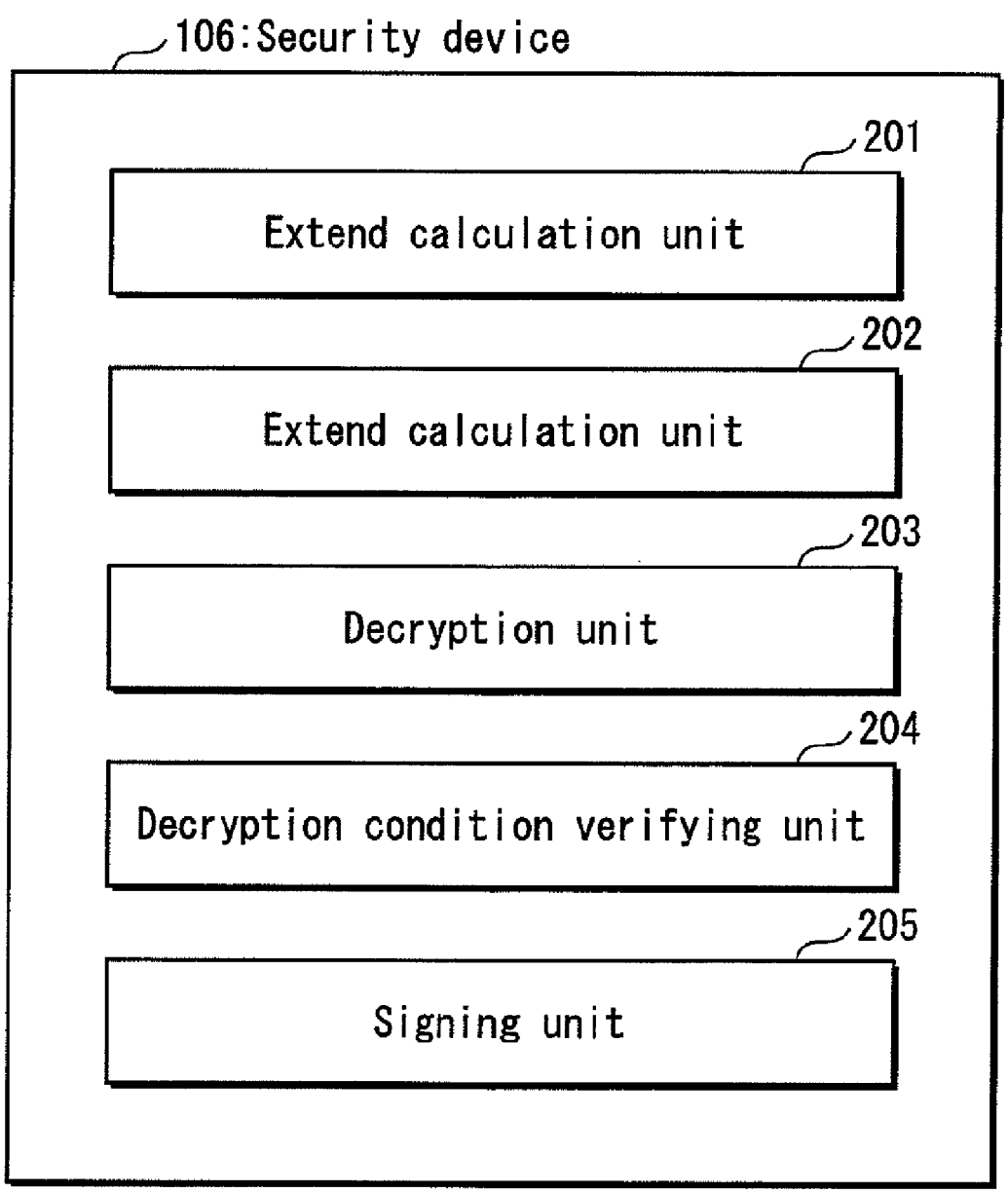
FIG. 2 is a block diagram showing the structure of the security device in Embodiment 1 of the present invention.

FIG. 2 is a block diagram showing the structure of the security device 106 in Embodiment 1 of the present invention. As shown in FIG. 2, the security device 106 is composed of an extend calculation unit 201, an extend value storage unit 202, a decryption unit 203, a decryption condition verifying unit 204, and a signing unit 205. The extend calculation unit 201 performs an extend calculation on a digest received from the CPU 101. The extend value storage unit 202 stores a result of the extend calculation performed by the extend calculation unit 201. The decryption unit 203 decrypts sealed encrypted data, in accordance with an unseal command received from the CPU 101. The decryption condition verifying unit 204 verifies whether or not the decryption condition included in the sealed data is satisfied. The signing unit 205 signs the results of the extend calculation stored in the extend value storage unit 202. The security device 106 and the extend value storage unit 202 respectively correspond to the TPM 1602 and the PCR 1604 shown in FIG. 16.

The extend value storage unit 202 is specifically achieved by a nonvolatile memory. The extend calculation unit 201, the decryption unit 203, the decryption condition verifying unit 204, and the signing unit 205 are specifically achieved by the combination of the CPU (not illustrated), an encryption process accelerator (not illustrated) such as an encryption coprocessor, and a nonvolatile memory (not illustrated) embedded in the security device 106. The nonvolatile memory stores microcodes to be executed by the CPU and the encryption process accelerator.

The security device 106 is tamper-resistant, and the values stored in the extend value storage unit 202 cannot be tampered with in an unauthorized manner from outside.

Figure 3A:
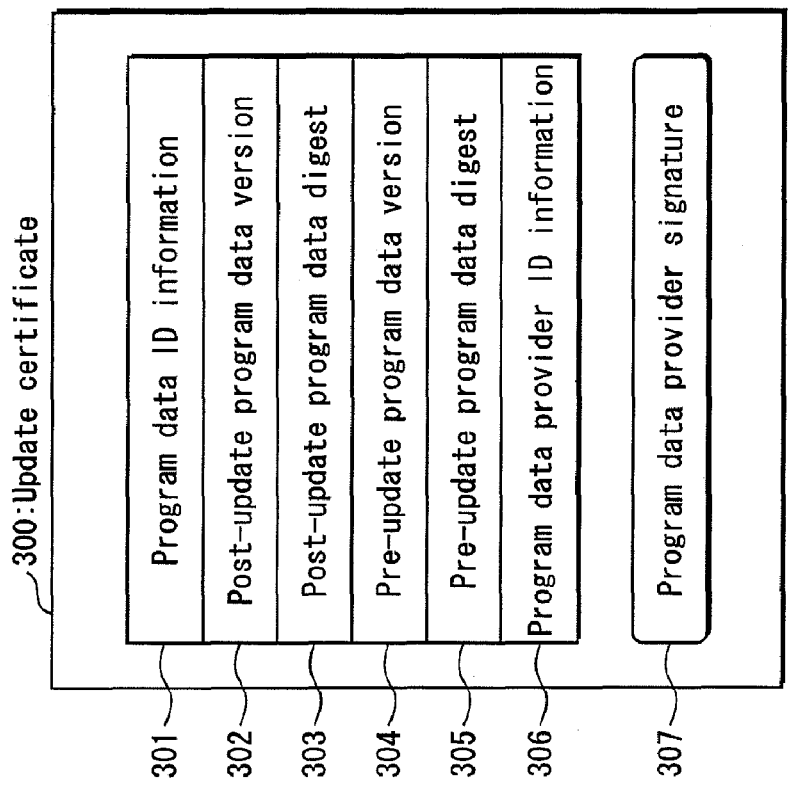
FIG. 3A shows the data structure of the update certificate in Embodiments 1 through 4 of the present invention.

As shown in FIG. 3A, an update certificate 300 stored in the update certificate storage unit 102 is a certificate by which the program data provider guarantees an update of the program data. The update certificate 300 is composed of program data ID information 301, a post-update program data version 302, a post-update program data digest 303, a pre-update program data version 304, a pre-update program data digest 305, a program data provider ID information 306, and a program data provider signature 307.

For example, in a case where the program data ID information 301 is PROGRAM_A, the post-update program data version 302 is V2.0, and the pre-update program data version 304 is V1.0, the update certificate 300 certifies that program data PROGRAM_A is updated from version V1.0 to V2.0, that the digest of the program data of version V1.0 is indicated by the pre-update program data digest 305, and that the digest of the program data of version V2.0 is indicated by the post-update program data digest 303.

The update certificate storage unit 102 stores only the update certificate 300 that verifies the validity of the signature 307 of the update certificate 300.

Figure 4A:
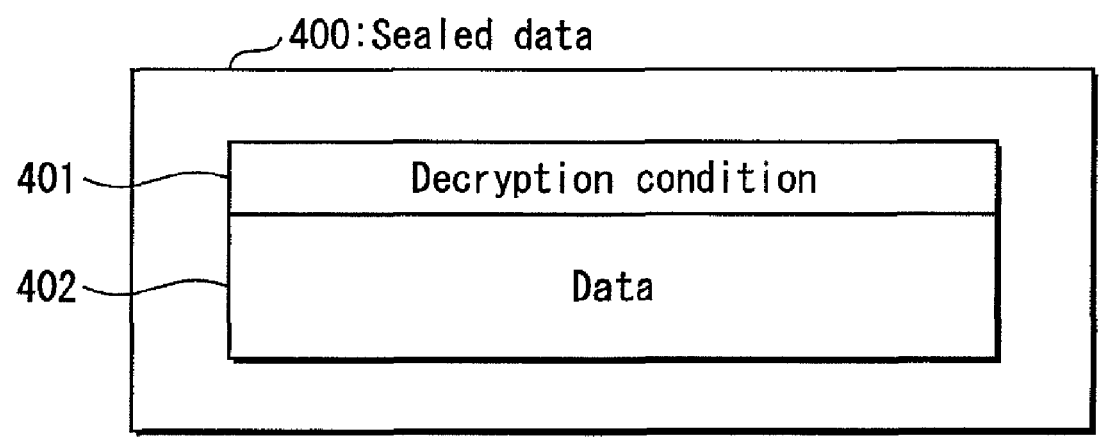
FIG. 4A shows the data structure of the sealed data in Embodiments 1 through 4 of the present invention.

As shown in FIG. 4A, sealed data 400 stored in the data storage unit 105 is encrypted data generated by encrypting concatenated data of a decryption condition 401 and data 402.

The decryption condition 401 is condition information that is used by the decryption condition verifying unit 204 of the security device 106 to judge whether or not decrypted data should be output to outside. The decryption condition 401 includes at least one piece of condition information that is a reference value being a result of an extend calculation performed on a program data digest. The decryption condition 401 may include a plurality of pieces of condition information. Also, the decryption condition 401 may include password information to be used for authenticating the user.

Figure 4B:
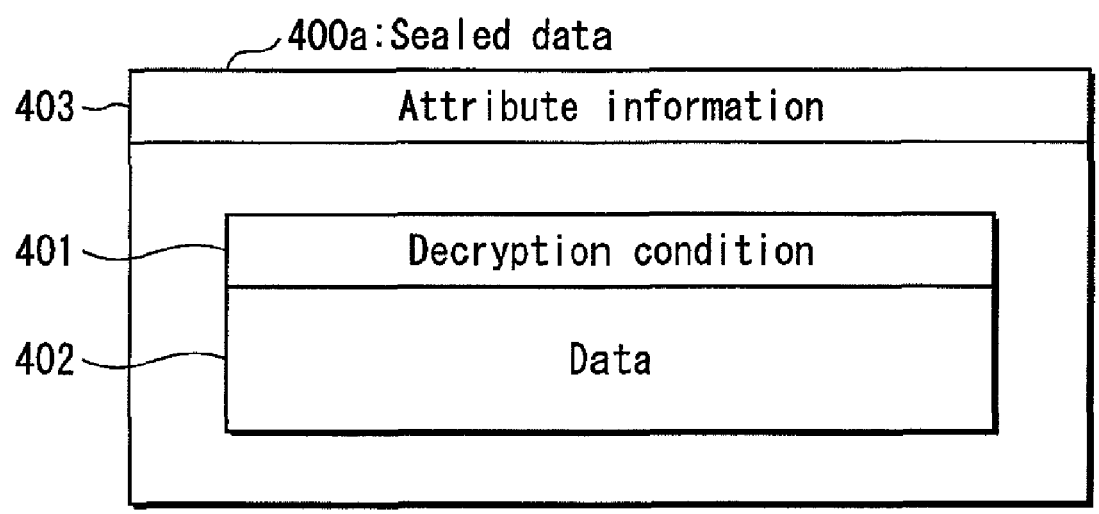
FIG. 4B shows the data structure of the sealed data in Embodiments 1 through 4 of the present invention which is attached with the attribute information.

Also, as shown in FIG. 4B, sealed data 400a stored in the data storage unit 105 may be attached with attribute information 403. The attribute information 403 is unencrypted information and includes a plain text that indicates a condition for decrypting the encrypted, sealed data 400a. For example, when the condition is that a predetermined piece of program data has been activated, the attribute information 403 includes ID information and version information of the predetermined piece of program data.

Next, the operation of the information terminal 100 in the present embodiment will be described.

The information terminal 100 is operated in the regular mode or in the restoration mode. In the regular mode, the information terminal 100 is operated regularly. In the restoration mode, the operation state before the update of the program data is restored in a pseudo manner, and the information terminal 100 is operated in the restored operation state.

The information terminal 100 is operated in the restoration mode when the user specifies the restoration mode when the information terminal 100 is booted, or when the user specified the restoration mode as the next operation mode when the information terminal 100 was operated previously. Otherwise, the information terminal 100 is operated in the regular mode. The CPU 101 holds information indicating an operation mode in which the information terminal 100 is operating.

When it fails to decrypt the encrypted, sealed data 400 stored in the data storage unit 105, the information terminal 100 displays a message urging the user to reboot the information terminal 100 in the restoration mode. Further, when the user specifies a boot in the restoration mode, the information terminal 100 is rebooted in the restoration mode.

When, as shown in FIG. 4B, the sealed data 400a is attached with the attribute information 403, the information terminal 100 compares the attribute information 403 (for example, ID information and version information of certain program data) with the program data that is currently executed (for example, ID information and version information of the currently executed program data), at the timing when the user instructs to access the sealed data 400a. When the contents of the attribute information 403 do not match the currently executed program data, the information terminal 100 displays a message urging the user to reboot the information terminal 100 in the restoration mode. Further, when the user specifies the boot in the restoration mode, the information terminal 100 is rebooted in the restoration mode.

Figure 5:
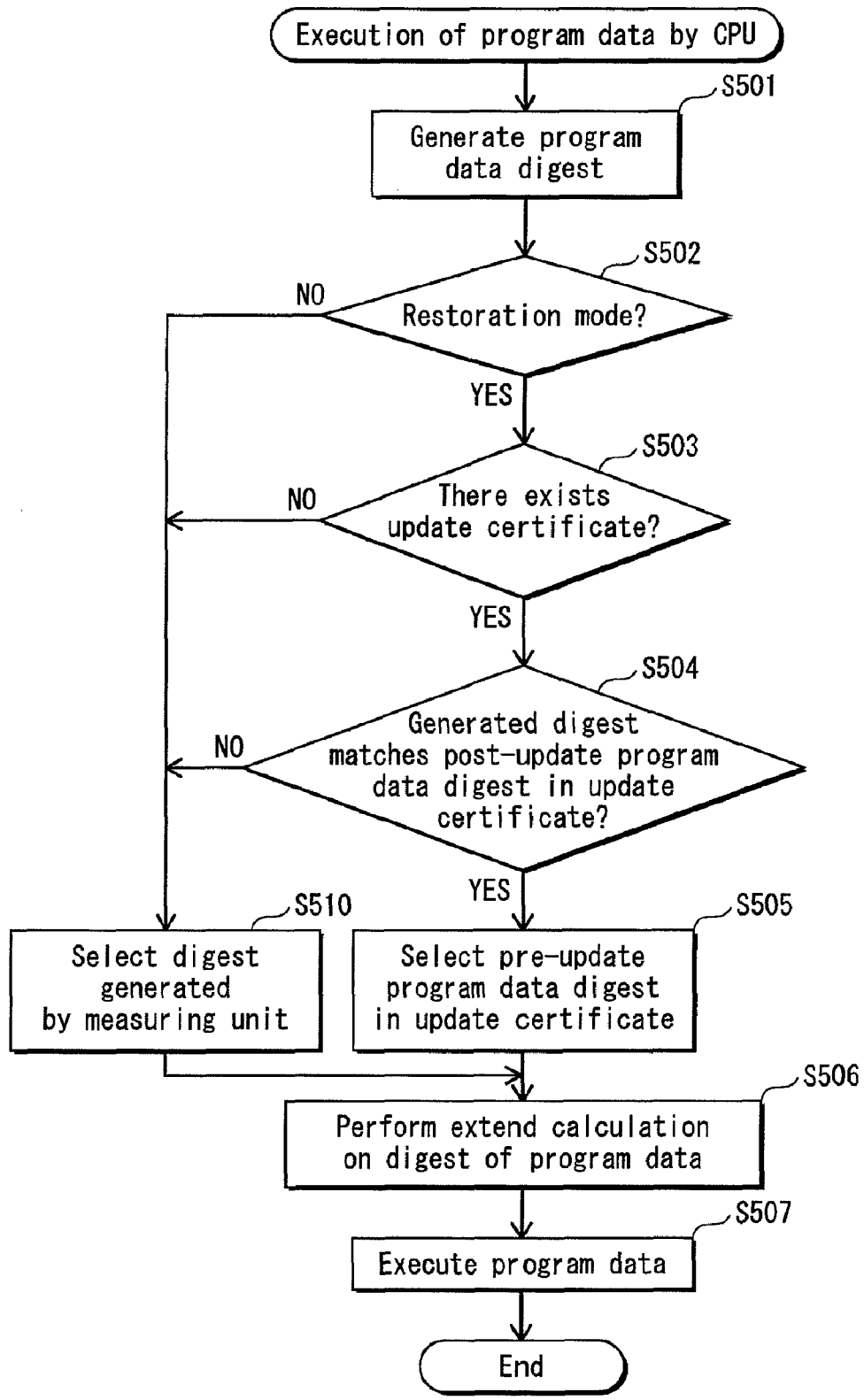
FIG. 5 is a flowchart showing the process performed by the CPU of the information terminal in Embodiment 1 or Embodiment 2 of the present invention to execute one piece of program data.

In the following, the process in which the CPU 101 executes one program data will be described with reference to FIG. 5. FIG. 5 is a flowchart showing the process performed by the CPU of the information terminal in Embodiment 1 or Embodiment 2 (which will be described later) of the present invention to execute one piece of program data. The CPU 101 of the information terminal 100 executes the program data stored in the program storage unit 107. The CPU 101, when executing the program data, instructs the measuring unit 104 to generate a digest of the program data to be executed. Also, the CPU 101 instructs the security device 106 to hold a result of the extend calculation of the digest.

First, the measuring unit 104 generates a digest of the program data to be executed (step S501). More specifically, the measuring unit 104 generates the digest by performing a hash calculation of the SHA-1.

Next, the selection unit 103 judges whether or not the operation mode of the information terminal 100 is the restoration mode (step S502). When it is the restoration mode, the control moves to step S503; and when it is the regular mode, not the restoration mode, the control moves to step S510.

In step S503, the selection unit 103 judges whether or not there exists an update certificate 300 corresponding to the program data to be executed. When it exists, the control moves to step S504; and when it does not exist, the control moves to step S510. More specifically, in step S503, the selection unit 103 judges whether or not there exists an update certificate 300 corresponding to the program data to be executed, by referring to the update certificate stored in the update certificate storage unit 102 and checking the program data ID information 301 of the update certificate. Note that, when it is judged that there exists an update certificate 300 corresponding to the program data to be executed, the validity of the update certificate 300 may be verified again.

In step S504, the selection unit 103 judges whether or not the generated digest matches the post-update program data digest 303 in the update certificate to verify whether or not the program data to be executed matches the post-update program data identified by the update certificate. When the judgment result indicates that they match, namely, the program data to be executed is the post-update program data identified by the update certificate, the control moves to step S505. When the judgment result indicates that they do not match, namely, the program data to be executed is not the post-update program data identified by the update certificate, the control moves to step S510.

In step S505, the selection unit 103 selects the pre-update program data digest 305 in the update certificate as the data on which the security device 106 should perform the extend calculation, and requests the security device 106 to perform the extend calculation.

In step S510, the selection unit 103 selects the program data digest generated by the measuring unit 104, as the data on which the security device 106 should perform the extend calculation, and requests the security device 106 to perform the extend calculation.

When the security device 106 is requested to perform the extend calculation, the extend calculation unit 201 of the security device 106 performs the extend calculation on the program data digest specified in the request. More specifically, the extend calculation unit 201 obtains data by concatenating the data stored in the extend value storage unit 202 with the program data digest selected by the selection unit 103, generates a digest of the obtained data, and stores the generated digest into the extend value storage unit 202 (step S506). The CPU 101 executes the program data only after the extend calculation performed by the security device 106 in step S506 is completed (step S507).

The process shown in FIG. 5 is performed each time the CPU 101 executes the program data. As this process is performed a plurality of times, the extend value storage unit 202 of the security device 106 stores results of the extend calculation performed onto a plurality of pieces of program data executed by the CPU 101. The value stored in the extend value storage unit 202 varies depending on the combination of pieces of program data executed by the CPU 101. That is to say, the value stored in the extend value storage unit 202 indicates a combination of pieces of program data executed by the CPU 101.

Note that, in the restoration mode, the CPU 101 executes post-update program data, but the extend value storage unit 202 stores a result of an extend calculation performed onto pre-update program data digest.

Figure 16:
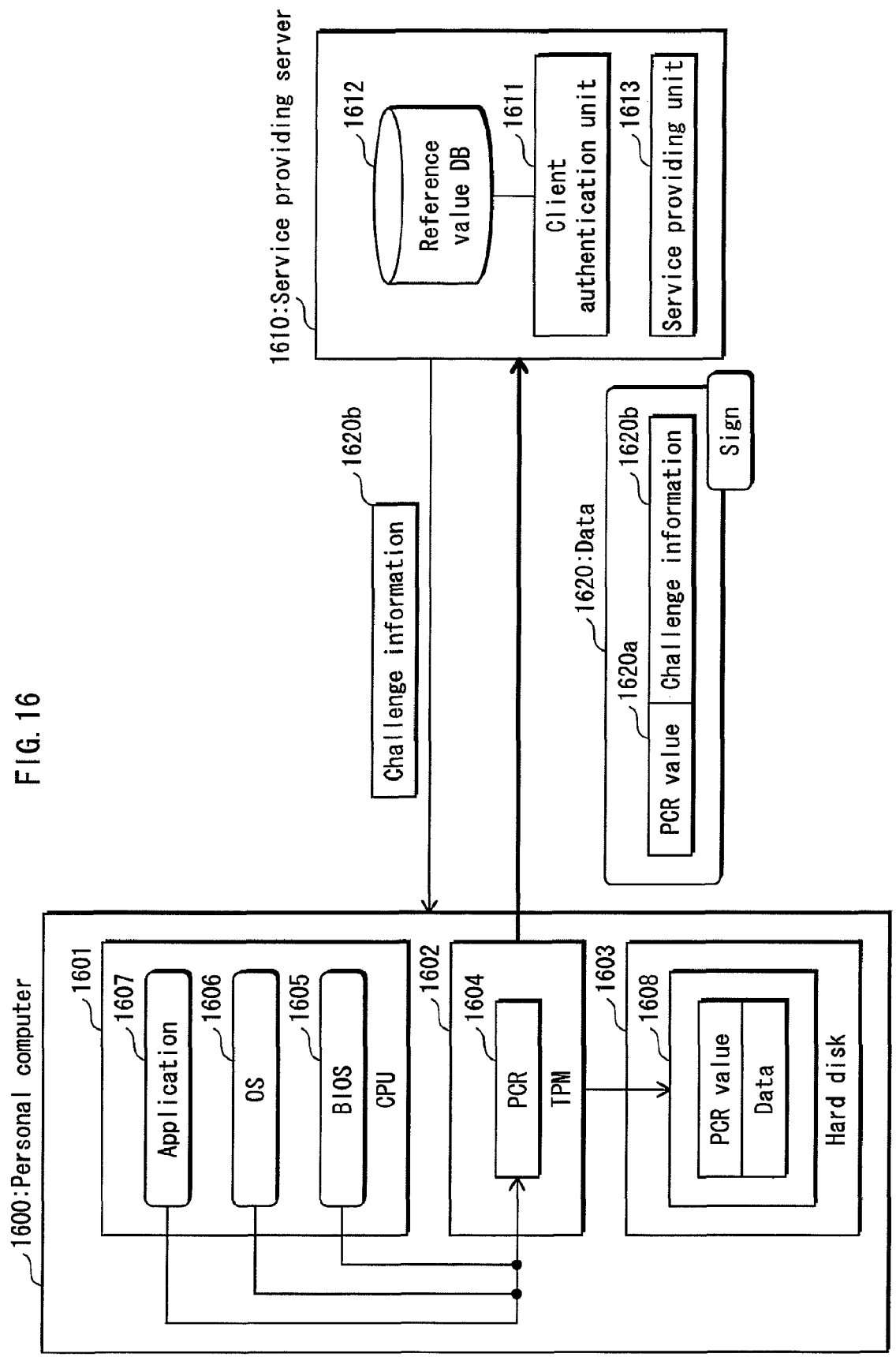
FIG. 16 is a block diagram showing a conventional technology and the structure of the service providing server.

When receiving a service of information from a service providing server 1610 shown in FIG. 16, the information terminal 100 transmits data to the service providing server 1610, where the data to be transmitted is obtained as the security device 106 signs a value stored in the extend value storage unit 202 of the security device 106. Here, the data obtained by signing a value stored in the extend value storage unit 202 of the security device 106 is obtained as the signing unit 205, according to a request from the CPU 101, signs data that is obtained by concatenating the value stored in the extend value storage unit 202 with challenge information 1620b received from the service providing server 1610 (a random number generated by the service providing server 1610, or the like).

In the case where a reference value DB 1612 of the service providing server 1610 is updated in compliance with the update of the program data performed by the information terminal 100, the information terminal 100, while it is operating in the regular mode, transmits data to the service providing server 1610, where the data to be transmitted is obtained as the security device 106 signs a value stored in the extend value storage unit 202 of the security device 106. With such an arrangement, the information terminal 100 can pass the authentication performed by the service providing server 1610 and receive a service of information.

On the other hand, in the case where the reference value DB 1612 of the service providing server 1610 is not updated in compliance with the update of the program data performed by the information terminal 100, the user specifies the boot in the restoration mode. Then, the information terminal 100, after it is rebooted in the restoration mode, transmits data to the service providing server 1610, where the data to be transmitted is obtained as the security device 106 signs a value stored in the extend value storage unit 202 of the security device 106. In this case, since the extend value storage unit 202 stores a result of an extend calculation performed onto pre-update program data digest, the information terminal 100 can pass the authentication performed by the service providing server 1610 and receive a service of information even if the reference value DB 1612 of the service providing server 1610 has not been updated.

Note that, when performing the above-described operation, the information terminal 100 may notify the service providing server 1610 that the program data that is actually executed by the information terminal 100 has been updated, as well. In this case, the information terminal 100 transmits data to the service providing server 1610, where the data to be transmitted is obtained as the security device 106 signs a value stored in the extend value storage unit 202 of the security device 106 and signs information indicating an update of the program data (for example, the information may be flag information indicating an update of the program data, ID information of the updated program data, a version of post-update program data, or the like).

Here, the data obtained by signing a value stored in the extend value storage unit 202 of the security device 106 and signing information indicating an update of the program data is data that is obtained as the signing unit 205 of the security device 106, according to a request from the CPU 101, signs data that is obtained by concatenating the value stored in the extend value storage unit 202, the challenge information 1620b received from the service providing server 1610, and the information indicating the update of the program data. In this case, the CPU 101 sends, to the signing unit 205 of the security device 106, a request including the challenge information 1620b received from the service providing server 1610 and the information indicating the update of the program data. Upon receiving the request from the CPU 101, the signing unit 205 obtains data by concatenating the value stored in the extend value storage unit 202, the challenge information 1620b, and the information indicating the update of the program data, and signs the obtained data.

When the service providing server 1610 receives, from the information terminal 100, the data obtained by signing the value stored in the extend value storage unit 202 and signing the information indicating the update of the program data, the program data that is actually executed by the information terminal 100 has been updated, regardless of whether the authentication resulted in a success. In view of this, the service providing server 1610 may partially restrict the service of information from being provided to the information terminal 100 based on the security policy having been determined preliminarily, or may update the reference value DB 1612 by accessing the source from which the updated program data was provided.

Figure 6:
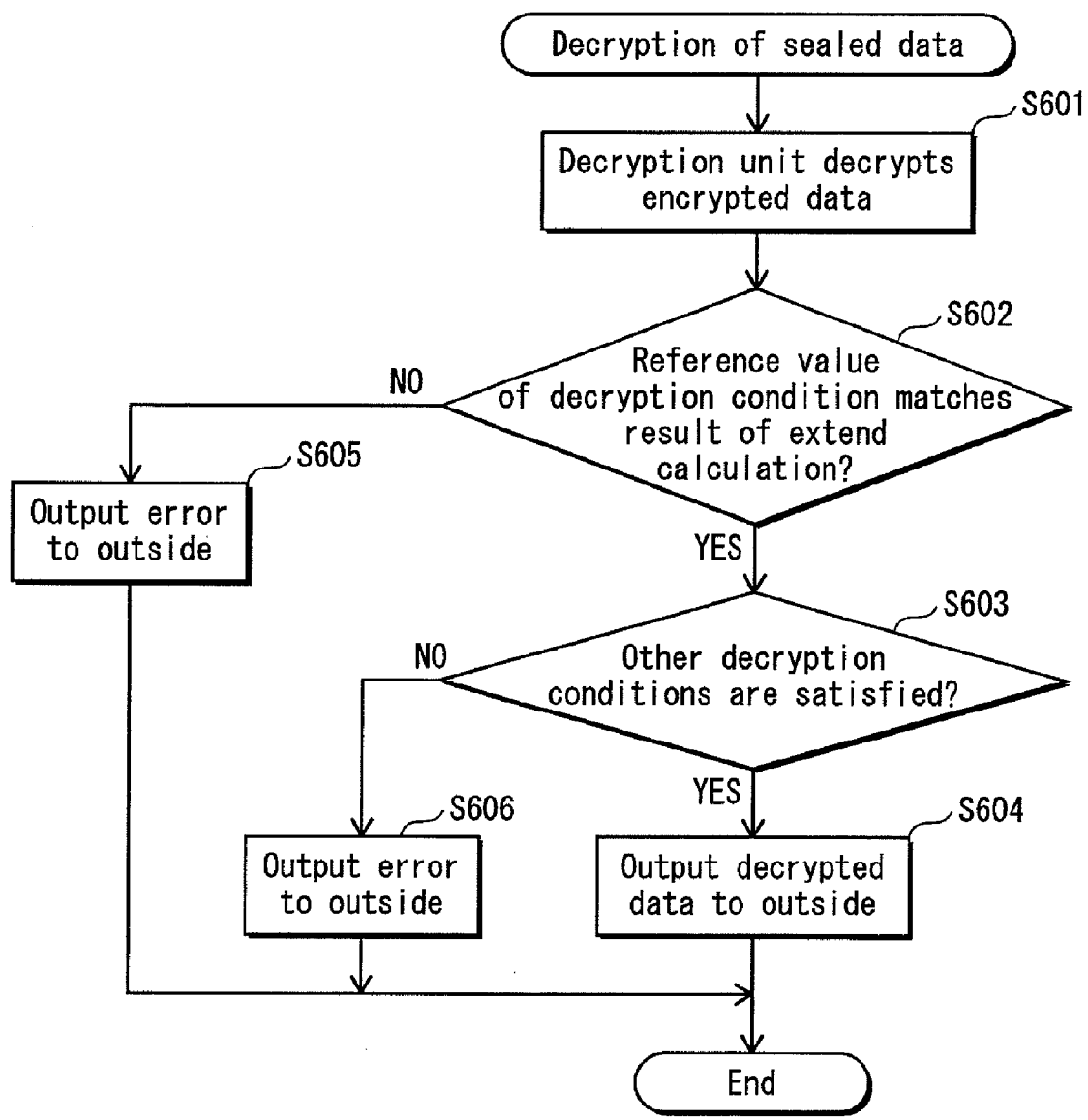
FIG. 6 is a flowchart showing the process in which the information terminal of Embodiments 1, 2 and 3 decrypts the encrypted, sealed data.

Next, the process in which the information terminal 100 of the present invention decrypts the encrypted, sealed data 400 and 400a will be described with reference to FIG. 6. FIG. 6 is a flowchart showing the process in which the information terminal 100 of Embodiments 1, 2 and 3 decrypts the encrypted, sealed data 400 and 400a. In this process, the security device 106 of the information terminal 100 decrypts the encrypted, sealed data 400 and 400a stored in the data storage unit 105.

First, in accordance with the unseal command received from the CPU 101, the decryption unit 203 decrypts sealed encrypted data 400 and 400a that have been sealed inside the security device 106 (step S601). For the decryption at this time, a decryption key managed by the decryption unit 203 is used. With this decryption, plain texts of the decryption condition 401 and the data 402 are obtained.

Next, the decryption condition verifying unit 204 judges whether or not the value stored in the extend value storage unit 202 matches the reference value included in the decryption condition 401 being a result of an extend calculation performed on a program data digest (step S602). When they match, the control moves to step S603; and when they do not match, an error is output to indicate that the decryption has failed, where the error indicates that the value stored in the extend value storage unit 202 does not match the reference value included in the decryption condition 401 being a result of an extend calculation performed on a program data digest (step S605).

In step S603, the decryption condition verifying unit 204 judges whether or not the other conditions (other than the reference value that is a result of an extend calculation performed on a program data digest) included in the decryption condition 401 are satisfied. When the conditions are satisfied, the decryption condition verifying unit 204 outputs the decrypted data 402 to outside the security device 106 (step S604). When the conditions are not satisfied, the decryption condition verifying unit 204 does not output the decrypted data 402, but outputs an error to outside to indicate that the decryption has failed, where the error indicates that the other conditions (other than the reference value that is a result of an extend calculation performed on a program data digest) included in the decryption condition 401 are not satisfied (step S606).

In the case where the sealed data has been sealed bound with a result of an extend calculation performed on a post-update program data digest, the security device 106 of the information terminal 100 decrypts the encrypted, sealed data in accordance with the flowchart shown in FIG. 6 in the state where the information terminal 100 has been booted in the regular mode.

On the other hand, in the case where the sealed data has been sealed, bound with a result of an extend calculation performed on a pre-update program data digest, the security device 106 outputs an error to outside to indicate that the decryption has failed, in the state where the information terminal 100 has been booted in the regular mode, where the error indicates that the value stored in the extend value storage unit 202 does not match the reference value included in the decryption condition 401 being a result of an extend calculation performed on a program data digest (step S605), in accordance with the flowchart shown in FIG. 6. The information terminal 100 then displays a message urging the user to reboot the information terminal 100 in the restoration mode. Further, when the user specifies the boot in the restoration mode, the information terminal 100 is rebooted in the restoration mode.

Also, in the state where the information terminal 100 has been booted in the restoration mode, the security device 106 decrypts the encrypted, sealed data.

In this case, since a result of an extend calculation performed on a pre-update program data digest is stored in the extend value storage unit 202, it is judged in step S602 that the value stored in the extend value storage unit 202 matches the reference value included in the decryption condition 401 being a result of an extend calculation performed on a program data digest. With this judgment, the sealed data is decrypted.

As described above, in the present embodiment, even after the program data is updated, it is possible to decrypt the sealed data and to receive an information service from a service providing server such as the service providing server 1610 which authenticates the program data executed by the CPU 101, without returning the updated program data to the state before the update.

Note that, when a same piece of program data identified by the program data ID information 301 is updated a plurality of times, a plurality of update certificates with the same program data ID information 301 and different versions are stored into the update certificate storage unit 102. In this case, existence of the plurality of update certificates in concern is confirmed in step S503 shown in FIG. 5, and then in step S504, it is judged, with respect to an update certificate having the newest version among them, whether or not the generated digest matches the post-update program data digest 303 in the update certificate. Further, in step S505, the user of the information terminal 100 specifies a version of the program data for which the state executed by the CPU 101 should be restored, and the selection unit 103 selects a pre-update program data digest in an update certificate having the specified version, from among the plurality of update certificates whose existence has been confirmed in step S503, and requests the security device 106 to perform the extend calculation.

Figure 3B:
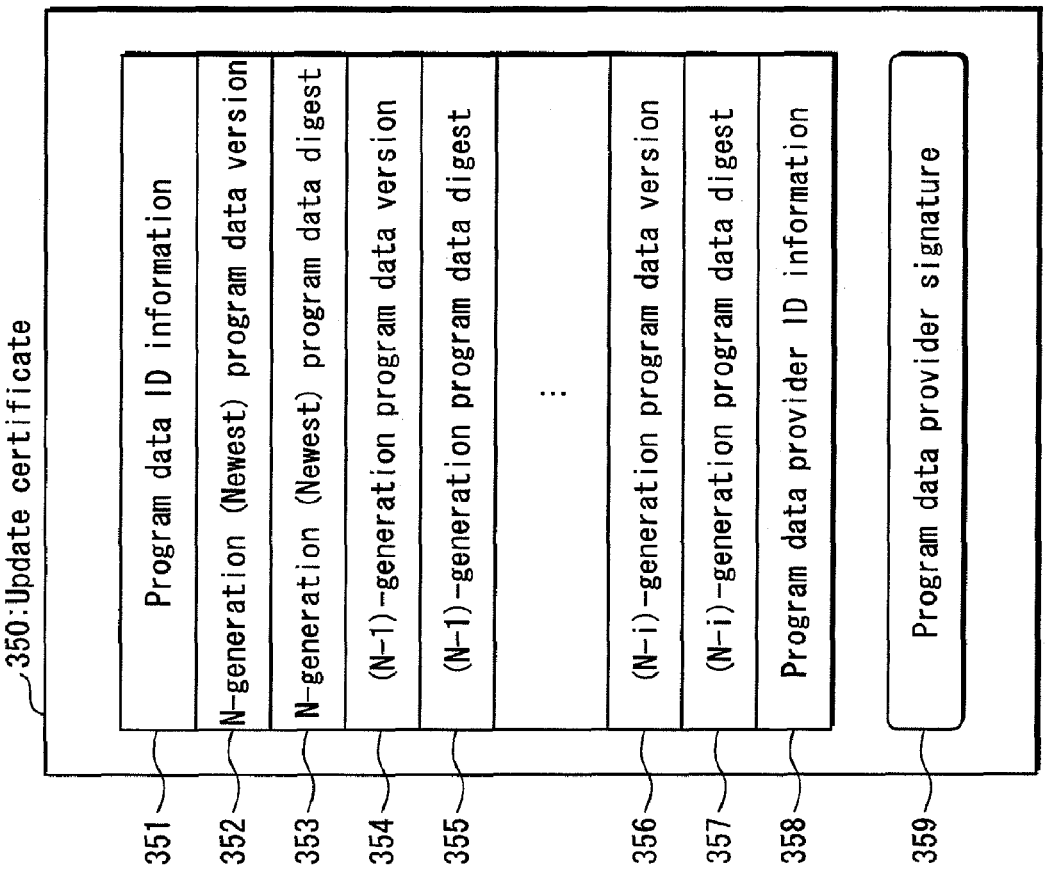
FIG. 3B shows the data structure of the update certificate in Embodiments 1 through 4 of the present invention, in which a plurality of digests of the same program data are included in association with a plurality of versions thereof.

Note that the update certificate to be stored in the update certificate storage unit 102, as shown in FIG. 3B as an update certificate 350, may have a data structure which includes a plurality of digests of the same program data in association with a plurality of versions thereof.

As shown in FIG. 3B, the update certificate 350 includes program data ID information 351, a newest N-generation program data version 352, a newest N-generation program data digest 353, a plurality of versions of the program data in association with a plurality of generations from the (N−1) generation to the (N−$i$) generation (the (N−1)-generation program data version 354 through the (N−$i$)-generation program data version 356), a plurality of digests of the program data in association with the plurality of generations from the (N−1) generation to the (N−$i$) generation (the (N−1)-generation program data digest 355 through the (N−$i$)-generation program data digest 357), a program data provider ID information 358, and a program data provider signature 359, where N is an integer 3 or higher, and "$i$" is an integer 1 or higher that is smaller than N.

In this case, in step S504 shown in FIG. 5, it is judged, with respect to the update certificate 350, whether or not the generated digest matches the newest N-generation program data digest in the update certificate. Further, in step S505, the user of the information terminal 100 specifies a desired version corresponding to one among the plurality of generations from the (N−1) generation to the (N−$i$) generation so that the corresponding program data is restored to the state where it is executed by the CPU 101, and the selection unit 103 selects a digest of program data having the specified version in the update certificate, and requests the security device 106 to perform the extend calculation.

Note that the above-described specification by the user may be omitted and the versions of the program data may be stored in association with pieces of sealed data, so that the CPU can determine the generation of the program data to be restored based on the version thereof and can restore the program data of the determined generation.

Embodiment 2

An information terminal 700 in Embodiment 2 of the present invention is structured, especially, to make it possible to select, with higher accuracy, a program data digest that is to be subjected to the extend calculation performed by the security device.

Figure 7:
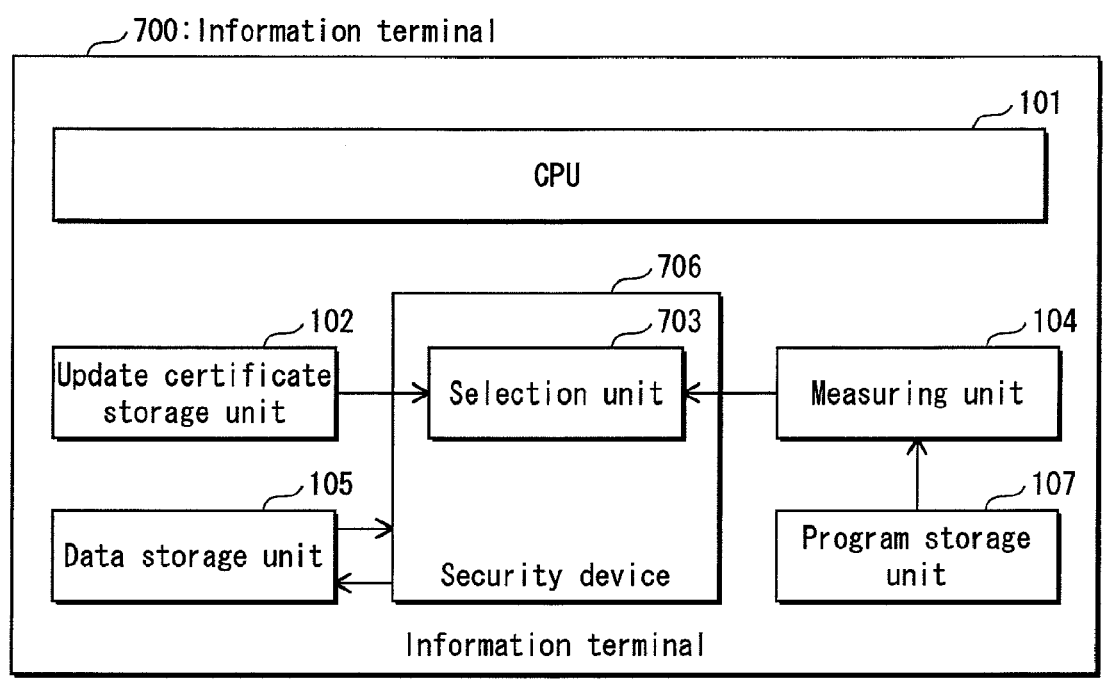
FIG. 7 is a block diagram showing the structure of the information terminal in Embodiment 2 of the present invention.
Figure 8:
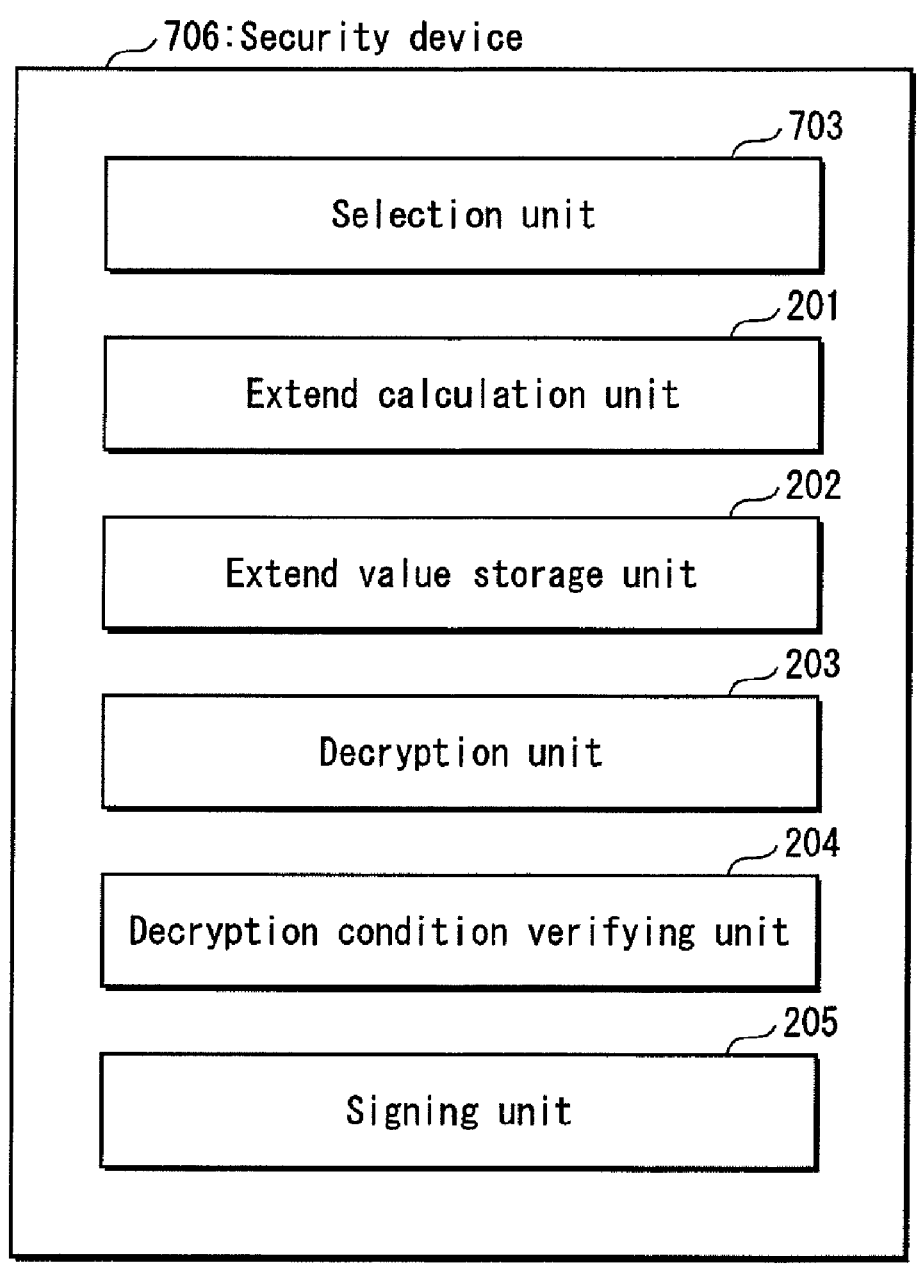
FIG. 8 is a block diagram showing the structure of the security device in Embodiment 2 of the present invention.

FIG. 7 is a block diagram showing the structure of the information terminal 700 in Embodiment 2 of the present invention. As shown in FIG. 7, according to Embodiment 2, a security device 706, which performs an extend calculation on a program data digest and stores results of the calculation, includes a selection unit 703 which selects a program data digest that is to be subjected to the extend calculation performed by the security device 706 (see FIGS. 7 and 8). The other structural elements (namely, the CPU 101, update certificate storage unit 102, measuring unit 104, data storage unit 105, and program storage unit 107) of the information terminal 700 are the same as those of the information terminal 100 in Embodiment 1. Also, the operation and function of the selection unit 703 is the same as those of the selection unit 103.

The selection unit 703, the extend calculation unit 201, the decryption unit 203, the decryption condition verifying unit 204, and the signing unit 205 are specifically achieved by the combination of the CPU, an encryption process accelerator, and a nonvolatile memory embedded in the security device 706. The nonvolatile memory stores microcodes to be executed by the CPU and the encryption process accelerator.

The operation of the information terminal 700 is the same as those of the information terminal 100 in Embodiment 1. More specifically, even after the program data is updated, it is possible to decrypt the sealed data and to receive an information service from a service providing server such as the service providing server 1610 which authenticates the program data executed by the CPU 101, without returning the updated program data to the state before the update.

As described above, according to the present embodiment, with the structure where the selection unit 703 is embedded in the security device 706 that is tamper-resistant, the processes performed by the selection unit 703 are protected from unauthorized acts such as hacking, and the processes performed in steps S502 through S505 and S510 in the flowchart shown in FIG. 5 can be executed with higher accuracy.

Note that the security device 706 may further include the update certificate storage unit 102 embedded therein. With this structure where the update certificate storage unit 102 is embedded in the security device 706 that is temper-resistant, it is possible to prevent unauthorized accesses to the update certificate, and the processes performed in steps S502 through S504 in the flowchart shown in FIG. 5 can be executed with higher accuracy.

Embodiment 3

Figure 9:
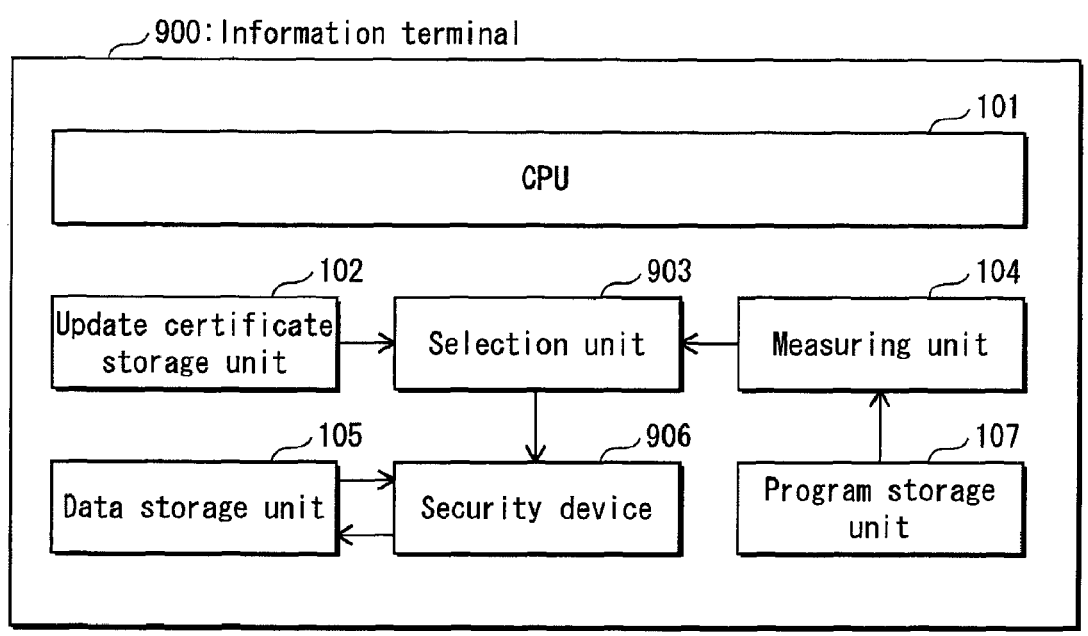
FIG. 9 is a block diagram showing the structure of the information terminal in Embodiment 3 of the present invention.
Figure 10:
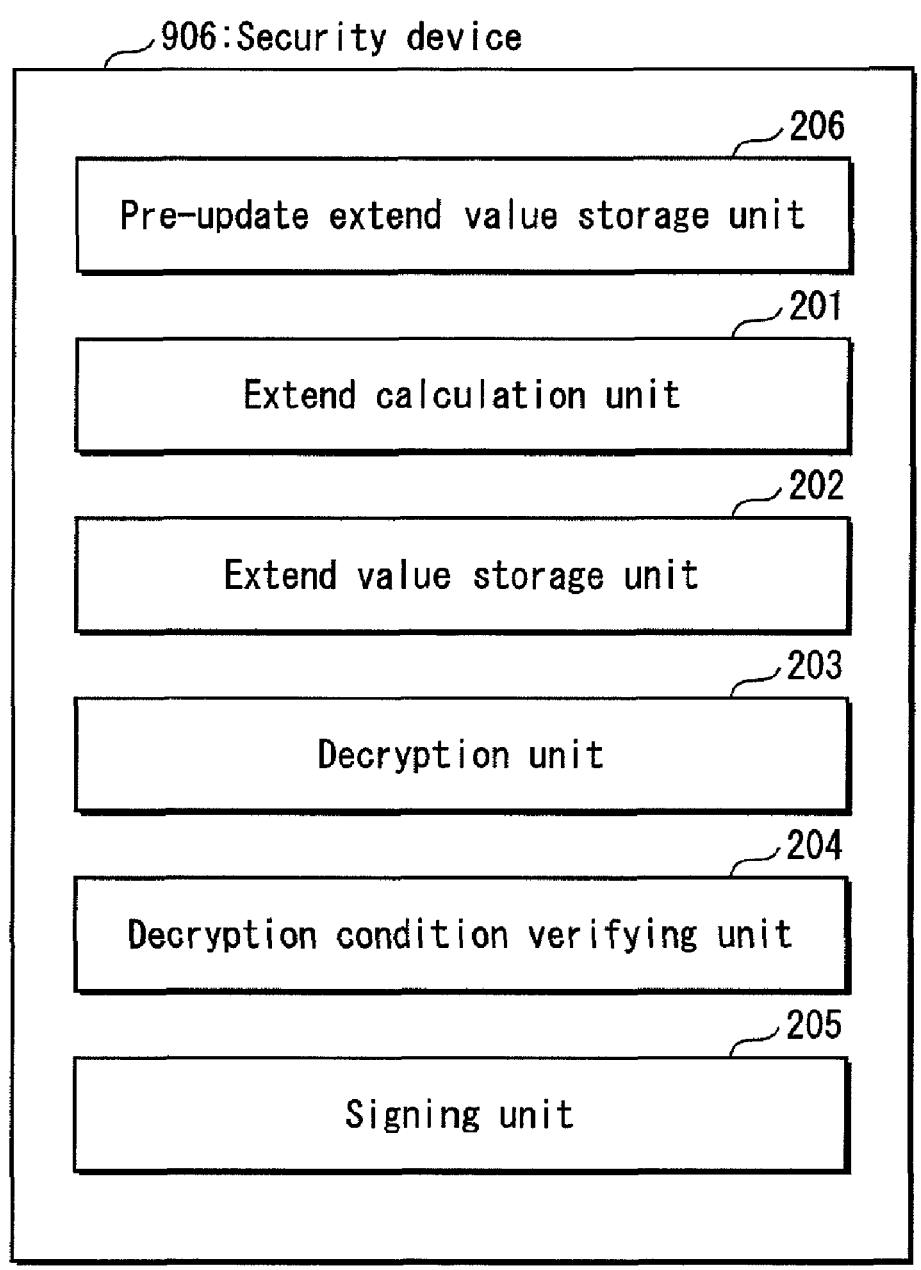
FIG. 10 is a block diagram showing the structure of the security device in Embodiment 3 of the present invention.

An information terminal 900 in Embodiment 3 of the present invention is structured to eliminate the necessity for booting in the restoration mode. FIG. 9 is a block diagram showing the structure of the information terminal 900 in Embodiment 3 of the present invention. As shown in FIG. 9, the information terminal 900 includes the same structural elements (namely, the CPU 101, update certificate storage unit 102, measuring unit 104, data storage unit 105, and program storage unit 107) as the information terminal 100 in Embodiment 1. With reference to FIG. 10, a security device 906, which performs an extend calculation on a program data digest and stores results of the calculation, includes a pre-update extend value storage unit 206 that stores one or more results of the extend calculation performed onto the program data digest when the CPU 101 executes pre-update program data. The selection unit 903 selects a program data digest that is to be subjected to the extend calculation performed by the security device. The selection unit 903 selects a pre-update program data digest in the update certificate, as the data to be subjected to the extend calculation together with the one or more extend calculation results stored in the pre-update extend value storage unit 206. Also, the selection unit 903 selects a program data digest generated by the measuring unit 104, as the data to be subjected to the extend calculation together with the other extend calculation results stored in the pre-update extend value storage unit 206.

The pre-update extend value storage unit 206 is specifically achieved by a nonvolatile memory. When the pre-update extend value storage unit 206 can store results of a plurality of extend calculations, it stores results of extend calculations performed onto different combinations of program data digests.

Figure 11:
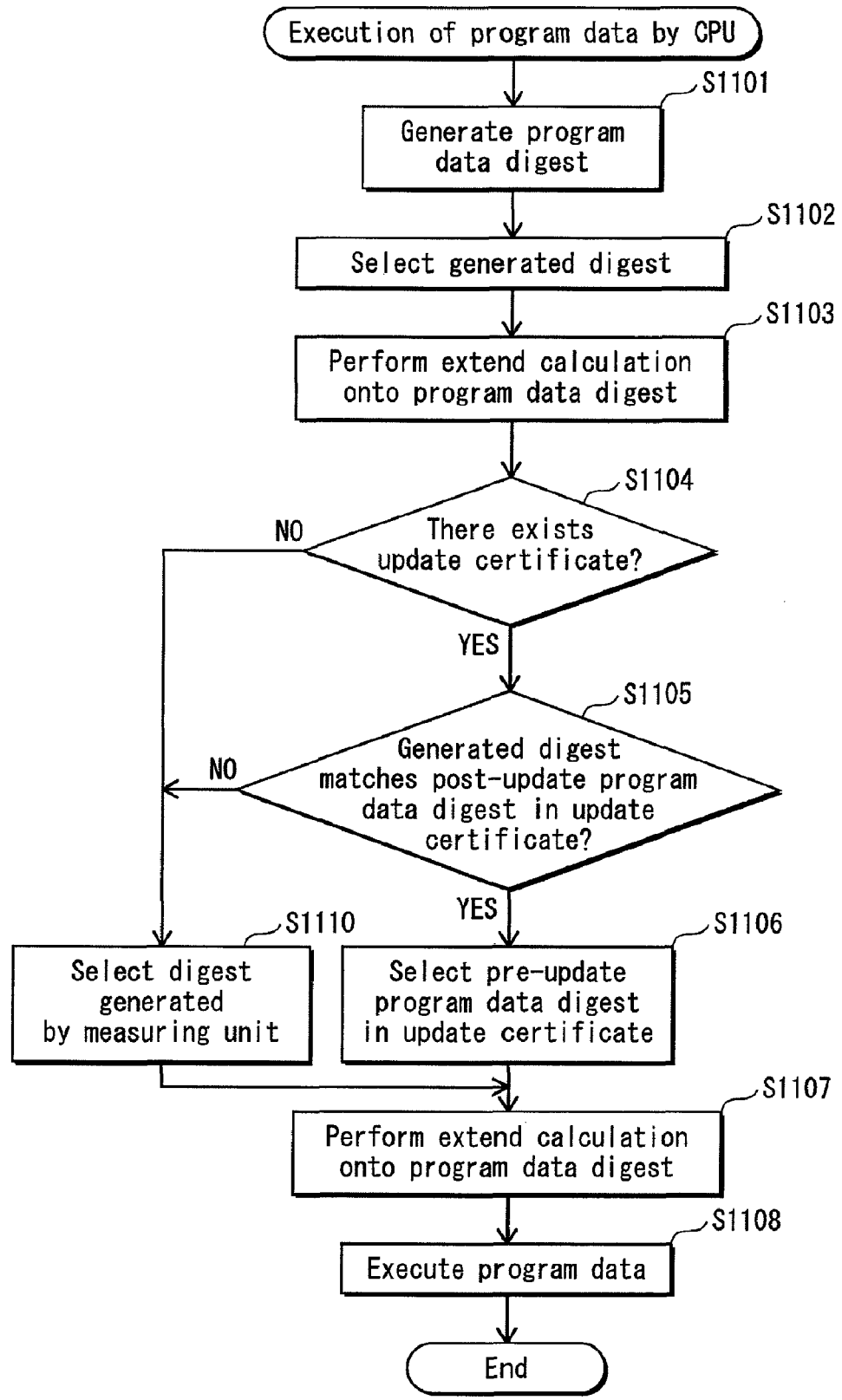
FIG. 11 is a flowchart showing the process performed by the CPU of the information terminal in Embodiment 3 or 4 of the present invention to execute one piece of program data.

Next, the operation of the information terminal 900 in Embodiment 3 will be described. A special operation mode such as the restoration mode is not provided in the information terminal 900, and the information terminal 900 merely operates in the regular mode. The CPU 101 of the information terminal 900 executes the program data stored in the program storage unit 107. The CPU 101, when it executes the program data, instructs the measuring unit 104 to generate a digest of the program data to be executed, and the security device 906 to hold the result of the extend calculation performed onto the generated digest. FIG. 11 is a flowchart showing the process performed by the CPU 11 to execute one piece of program data.

First, the measuring unit 104 generates a digest of the program data to be executed (step S1101). More specifically, the measuring unit 104 generates the digest by performing a hash calculation of the SHA-1.

Next, the selection unit 903 selects a program data digest generated by the measuring unit 104, as the data to be subjected to the extend calculation together with extend calculation results stored in the extend value storage unit 202 of the security device 906, and requests the security device 906 to perform the extend calculation (S1102). When the security device 906 is requested to perform the extend calculation, the extend calculation unit 201 performs the extend calculation on the program data digest specified in the request. More specifically, the extend calculation unit 201 obtains data by concatenating the data stored in the extend value storage unit 202 with the program data digest selected by the selection unit 903, generates a digest of the obtained data, and stores the generated digest into the extend value storage unit 202 (step S1103).

Next, the selection unit 903 judges whether or not there exists an update certificate corresponding to the program data to be executed (step S1104). When it exists, the control moves to step S1105; and when it does not exist, the control moves to step S1110. More specifically, in step S1104, the selection unit 103 judges whether or not there exists an update certificate corresponding to the program data to be executed, by referring to the update certificate stored in the update certificate storage unit 102 and checking the program data ID information 301 of the update certificate. Note that, when it is judged that there exists an update certificate corresponding to the program data to be executed, the validity of the update certificate may be verified again.

In step S1105, the selection unit 903 judges whether or not the generated digest matches the post-update program data digest 303 in the update certificate to verify whether or not the program data to be executed matches the post-update program data identified by the update certificate. When the judgment result indicates that they match, namely, the program data to be executed is the post-update program data identified by the update certificate, the control moves to step S1106. When the judgment result indicates that they do not match, namely, the program data to be executed is not the post-update program data identified by the update certificate, the control moves to step S1110.

In step S1106, the selection unit 903 selects the pre-update program data digest in the update certificate as the data on which the security device 906 should perform the extend calculation together with the one or more extend calculation results stored in the pre-update extend value storage unit 206. Also, the selection unit 903 selects a program data digest generated by the measuring unit 104, as the data to be subjected to the extend calculation together with the other extend calculation results stored in the pre-update extend value storage unit 206, and requests the security device 906 to perform the extend calculation.

In step S1110, the selection unit 903 selects the program data digest generated by the measuring unit 104, as the data to be further subjected to the extend calculation together with all the extend calculation results stored in the pre-update extend value storage unit 206 of the security device 906, and requests the security device 906 to perform the extend calculation.

When the security device 906 is requested to perform the extend calculation, the extend calculation unit 201 performs the extend calculation on the program data digest specified in the request. More specifically, the extend calculation unit 201 obtains data by concatenating the data stored in the pre-update extend value storage unit 206 with the program data digest selected by the selection unit 903, generates a digest of the obtained data, and stores the generated digest into the pre-update extend value storage unit 206 (step S1107).

The CPU 101 executes the program data only after the extend calculation performed by the security device 906 in step S1107 is completed (step S1108).

The process shown in FIG. 11 is performed each time the CPU 101 executes the program data. As this process is performed a plurality of times, the extend value storage unit 202 and the pre-update extend value storage unit 206 of the security device 906 stores results of the extend calculation performed onto a plurality of pieces of program data executed by the CPU 101. The value stored in the extend value storage unit 202 varies depending on the combination of pieces of program data executed by the CPU 101; and the value stored in the pre-update extend value storage unit 206 varies depending on the combination of pieces of pre-update program data executed by the CPU 101.

When receiving a service of information from a service providing server 1610 shown in FIG. 16, the information terminal 900 transmits data to the service providing server 1610, where the data to be transmitted is obtained as the security device 906 signs a value stored in the extend value storage unit 202 or the pre-update extend value storage unit 206 of the security device 906. Here, the data obtained by signing a value stored in the extend value storage unit 202 or the pre-update extend value storage unit 206 of the security device 906 is obtained as the signing unit 205, according to a request from the CPU 101, signs data that is obtained by concatenating the value stored in the extend value storage unit 202 or the pre-update extend value storage unit 206 with challenge information 1620b received from the service providing server 1610 (a random number generated by the service providing server 1610, or the like).

First, the information terminal 900 transmits, to the service providing server 1610, the data obtained by signing a value stored in the extend value storage unit 202 of the security device 906. In the case where a reference value DB 1612 of the service providing server 1610 is updated in compliance with the update of the program data performed by the information terminal 900, the information terminal 900 can pass the authentication performed by the service providing server 1610 and receive a service of information. On the other hand, in the case where the reference value DB 1612 of the service providing server 1610 is not updated in compliance with the update of the program data performed by the information terminal 900, the authentication performed by the service providing server 1610 results in an error, and the service providing server 1610 transmits an error message indicating the authentication failure to the information terminal 900. Upon receiving the error message, the information terminal 900 transmits, to the service providing server 1610, the data obtained by signing a value stored in the pre-update extend value storage unit 206 of the security device 906. In the case, since the pre-update extend value storage unit 206 stores a result of an extend calculation performed onto pre-update program data digest, the information terminal 900 can pass the authentication performed by the service providing server 1610 and receive a service of information without the boot in the restoration mode by the user which is required in Embodiment 1, even if the reference value DB 1612 of the service providing server 1610 has not been updated.

Note that, when performing the above-described operation, the information terminal 900 may notify the service providing server 1610 that the program data that is actually executed by the information terminal 900 has been updated, as well. In this case, the information terminal 900 transmits data to the service providing server 1610, where the data to be transmitted is obtained as the security device 906 signs a value stored in the pre-update extend value storage unit 206 of the security device 906 and signs information indicating an update of the program data (for example, the information may be flag information indicating an update of the program data, ID information of the updated program data, a version of post-update program data, or the like).

Here, the data obtained by signing a value stored in the pre-update extend value storage unit 206 of the security device 906 and signing information indicating an update of the program data is data that is obtained as the signing unit 205 of the security device 906, according to a request from the CPU 101, signs data that is obtained by concatenating the value stored in the pre-update extend value storage unit 206, the challenge information 1620b received from the service providing server 1610, and the information indicating the update of the program data. In this case, the CPU 101 sends, to the signing unit 205 of the security device 906, a request including the challenge information 1620b received from the service providing server 1610 and the information indicating the update of the program data. Upon receiving the request from the CPU 101, the signing unit 205 obtains data by concatenating the value stored in the pre-update extend value storage unit 206, the challenge information 1620b, and the information indicating the update of the program data, and signs the obtained data.

When the service providing server 1610 receives, from the information terminal 900, the data obtained by signing the value stored in the pre-update extend value storage unit 206 and signing the information indicating the update of the program data, the program data that is actually executed by the information terminal 900 has been updated, regardless of whether the authentication resulted in a success. In view of this, the service providing server 1610 may partially restrict the service of information from being provided to the information terminal 900 based on the security policy having been determined preliminarily, or may update the reference value DB 1612 by accessing the source from which the updated program data was provided.

Also, when the information terminal 900 of the present invention decrypts the encrypted, sealed data stored in the data storage unit 105, the security device 906 of the information terminal 900 decrypts the encrypted, sealed data in accordance with the flowchart shown in FIG. 6 in the same manner as in Embodiment 1, except the following.

That is to say, in step S602, the decryption condition verifying unit 204 judges whether or not the value stored in the extend value storage unit 202 or the pre-update extend value storage unit 206 matches the reference value included in the decryption condition 401 being a result of an extend calculation performed on a program data digest. When they match, the control moves to step S603; and when they do not match, an error is output to indicate that the decryption has failed (step S605).

In the case where the sealed data has been sealed bound with a result of an extend calculation performed on a pre-update program data digest, the pre-update extend value storage unit 206 stores a result of an extend calculation performed onto pre-update program data digest. Accordingly, in step S602, the decryption condition verifying unit 204 judges that the value stored in the pre-update extend value storage unit 206 matches the reference value included in the decryption condition 401 being a result of an extend calculation performed on a program data digest, and the security device 906 can decrypt the sealed data.

As described above, in the present embodiment, even after the program data is updated, it is possible to decrypt the sealed data and to receive an information service from a service providing server such as the service providing server 1610 which authenticates the program data executed by the CPU 101, without returning the updated program data to the state before the update. In addition, since the pre-update extend value storage unit 206 stores a result of an extend calculation performed onto pre-update program data digest, the information terminal 900 can pass the authentication performed by the service providing server 1610 and receive a service of information without the boot in the restoration mode by the user which is required in Embodiment 1, even if the reference value DB 1612 of the service providing server 1610 has not been updated.

Figure 12:
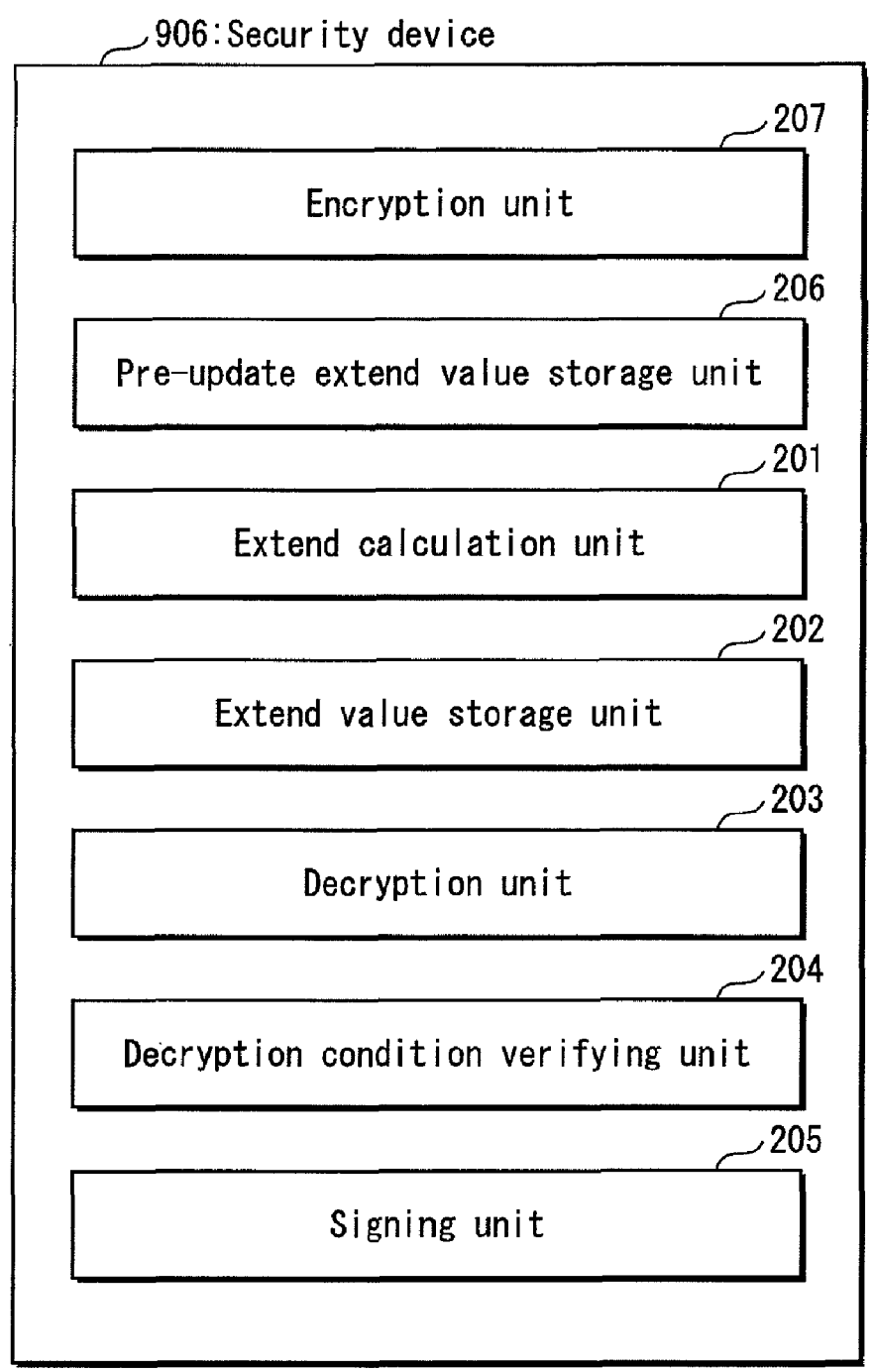
FIG. 12 is a block diagram showing the structure where the security device in Embodiment 3 of the present invention includes an encryption unit.

In the above explanation, after decrypting the sealed data, the security device 906 merely outputs the decrypted data. However, the decrypted data, which has been decrypted bound with a result of an extend calculation performed on a digest of a post-update program data that is being executed by the CPU 101, may be sealed, namely, re-encrypted, and the sealed data may be output as well as the decrypted data. To achieve this, the security device 906 may further include an encryption unit 207 shown in FIG. 12.

Figure 13:
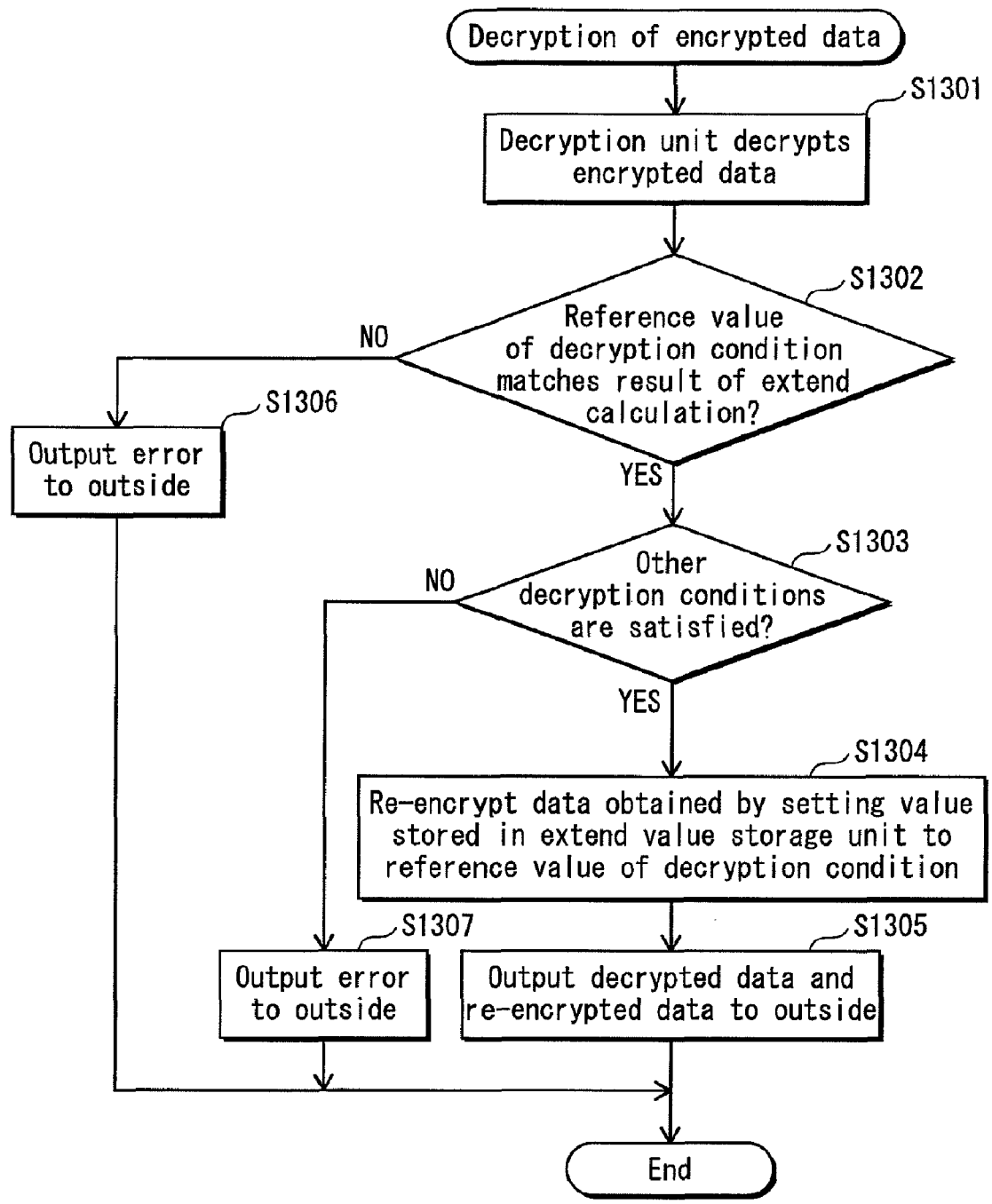
FIG. 13 is a flowchart showing the process in which the information terminal in Embodiment 3 of the present invention performs the decryption and re-encryption of the sealed data.

When a decryption and re-encryption of the sealed data stored in the data storage unit 105 is to be performed, the security device 906 performs the decryption and re-encryption of the sealed data in accordance with the flowchart shown in FIG. 13. FIG. 13 is a flowchart showing the process in which the information terminal 900 in the present embodiment performs the decryption and re-encryption of the sealed data.

First, the decryption unit 203 of the security device 906 decrypts the encrypted data that has been sealed inside the security device 906, in accordance with an unseal command received from the CPU 101 (step S1301). For the decryption at this time, a decryption key managed by the decryption unit 203 is used. With this decryption, plaintexts of the decryption condition 401 and the data 402 are obtained.

Next, the decryption condition verifying unit 204 judges whether or not the value stored in the extend value storage unit 202 or the pre-update extend value storage unit 206 matches the reference value included in the decryption condition 401 being a result of an extend calculation performed on a program data digest (step S1302). When the value stored in either the extend value storage unit 202 or the pre-update extend value storage unit 206 matches the reference value, the control moves to step S1303; and when neither of the values stored in the extend value storage unit 202 and the pre-update extend value storage unit 206 matches the reference value, an error is output to indicate that the decryption has failed, where the error indicates that neither of the values stored in the extend value storage unit 202 and the pre-update extend value storage unit 206 matches the reference value included in the decryption condition 401 being a result of an extend calculation performed on a program data digest (step S1306).

In step S1303, the decryption condition verifying unit 204 judges whether or not the other conditions (other than the reference value that is a result of an extend calculation performed on a program data digest) included in the decryption condition 401 are satisfied. When the conditions are satisfied, the control moves to step S1304. When the conditions are not satisfied, the decryption condition verifying unit 204 outputs an error to outside to indicate that the decryption has failed, where the error indicates that the other conditions (other than the reference value that is a result of an extend calculation performed on a program data digest) included in the decryption condition 401 are not satisfied (step S1307).

In step S1304, the encryption unit 207 re-encrypts the data that has been obtained by setting the value stored in the extend value storage unit 202 to the reference value of the decryption condition. In step S1305, the encryption unit 207 outputs the decrypted data 402 and the re-encrypted data to outside the security device 906.

The re-encrypted data output at this time is data that has been sealed bound with a result of an extend calculation performed on a digest of a post-update program data that is executed by the CPU 101.

Note that, when a same piece of program data identified by the program data ID information 301 has been updated a plurality of times, a plurality of update certificates with the same program data ID information 301 and different versions are stored into the update certificate storage unit 102. In this case, existence of the plurality of update certificates in concern is confirmed in step S1104 shown in FIG. 11, and then in step S1105, the selection unit 903 judges, with respect to an update certificate having the newest version among them, whether or not the generated digest matches the post-update program data digest in the update certificate.

Further, in step S1106, the user of the information terminal 900 specifies a version of the program data for which the state executed by the CPU 101 should be restored, and the selection unit 903 selects a pre-update program data digest in an update certificate having the specified version, from among the plurality of update certificates whose existence has been confirmed in step S1104, and requests the security device 906 to perform the extend calculation.

In the above explanation, the user of the information terminal 900 specifies a version of the program data for which the state executed by the CPU 101 should be restored. However, when the pre-update extend value storage unit 206 can store enough amount of results of a plurality of extend calculations, the user may not specify the version of the program data, but in step S1106, the selection unit 903 may select the pre-update program data digest 305 in each of the update certificates 300 identified in step S1104, and request the security device 906 to perform the extend calculation.

Also, in the case where the update certificate to be stored in the update certificate storage unit 102 is an update certificate 350 shown in FIG. 3B that includes a plurality of digests of the same program data in association with a plurality of versions thereof, the selection unit 903 of the information terminal 900, in step S1105 of the process flow shown in FIG. 11, judges whether or not the generated digest matches the newest N-generation program data digest in the update certificate 350.

Further, in step S1106, the user of the information terminal 900 specifies a desired version corresponding to one among the plurality of generations from the (N−1) generation to the (N−i) generation included in the update certificate 350 so that the corresponding program data is restored to the state where it is executed by the CPU 101, and the selection unit 903 selects a digest of program data having the specified version in the update certificate 350, and requests the security device 906 to perform the extend calculation.

Still further, in the above explanation, the user of the information terminal 900 specifies a version of the program data for which the state executed by the CPU 101 should be restored. However, when the pre-update extend value storage unit 206 can store enough amount of results of a plurality of extend calculations, the user may not specify the version of the program data, but in step S1106, the selection unit 903 may select digests that respectively correspond to the plurality of generations from the (N−1) generation to the (N−i) generation included in the update certificate 350, and request the security device 906 to perform the extend calculation.

Embodiment 4

An information terminal 1400 in Embodiment 4 of the present invention is structured, especially, to make it possible to select, with higher accuracy, a program data digest that is to be subjected to the extend calculation performed by the security device.

Figure 14:
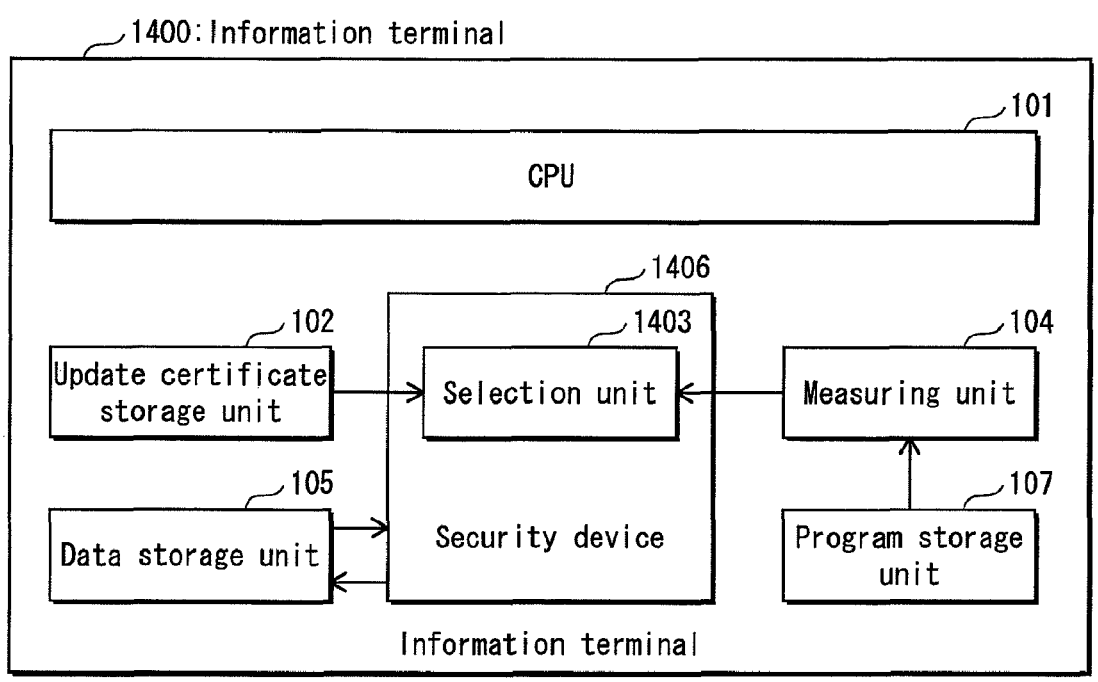
FIG. 14 is a block diagram showing the structure of the information terminal in Embodiment 4 of the present invention.

FIG. 14 is a block diagram showing the structure of the information terminal 1400 in Embodiment 4 of the present invention. The information terminal 1400 is represented by the same block diagram as that of the information terminal 700 in Embodiment 2, except for a security device 1406. The security device 1406 differs from the security device 906 of Embodiment 3 in structure in the following points.

Figure 15B:
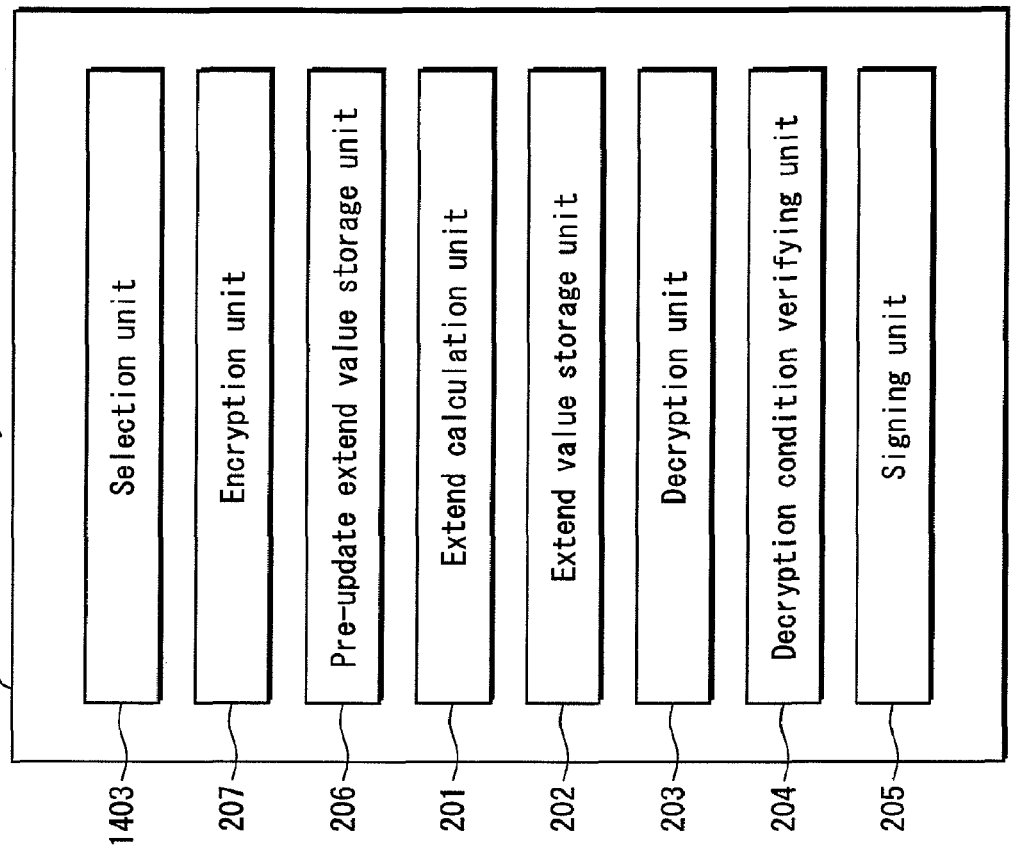
FIG. 15B is a block diagram showing the structure where the security device in Embodiment 4 of the present invention includes an encryption unit.
Figure 15A:
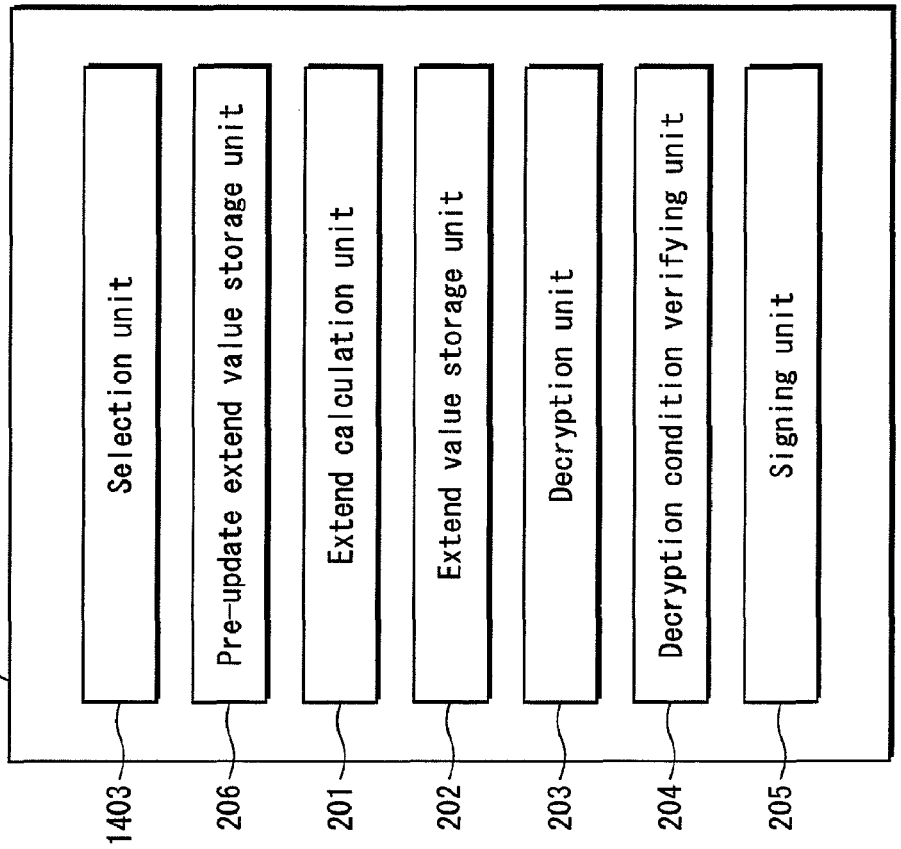
FIG. 15A is a block diagram showing the structure of the security device in Embodiment 4 of the present invention.

As shown in FIG. 15A, according to Embodiment 4, the security device 1406, which performs an extend calculation on a program data digest and stores results of the calculation, includes a selection unit 1403 which selects a program data digest that is to be subjected to the extend calculation performed by the security device 1406. The other structural elements (namely, the CPU 101, update certificate storage unit 102, measuring unit 104, data storage unit 105, and program storage unit 107) of the information terminal 1400 are the same as those of the information terminal 900 in Embodiment 3.

The selection unit 1403, the extend calculation unit 201, the decryption unit 203, the decryption condition verifying unit 204, and the signing unit 205 are specifically achieved by the combination of the CPU, an encryption process accelerator, and a nonvolatile memory embedded in the security device 1406. The nonvolatile memory stores microcodes to be executed by the CPU and the encryption process accelerator.

The operation of the information terminal 1400 is the same as those of the information terminal 900 in Embodiment 3. More specifically, even after the program data is updated, it is possible to decrypt the sealed data and to receive an information service from a service providing server such as the service providing server 1610 which authenticates the program data executed by the CPU 101, without returning the updated program data to the state before the update.

As described above, according to the present embodiment, with the structure where the selection unit 1403 is embedded in the security device 1406 that is tamper-resistant, the processes performed by the selection unit 1403 are protected from unauthorized acts such as hacking, and the processes performed in steps S1102, S1110, S1104 through S1106 in the flowchart shown in FIG. 11 can be executed with higher accuracy. Also, since the pre-update extend value storage unit 206 stores a result of an extend calculation performed onto pre-update program data digest, the information terminal 1400 can pass the authentication performed by the service providing server 1610 and receive a service of information without the boot in the restoration mode by the user which is required in Embodiment 1, even if the reference value DB 1612 of the service providing server 1610 has not been updated.

A variation of Embodiment 4 is shown in FIG. 15B as a security device 1406a. The security device 1406a has the same structure as the security device 1406 shown in FIG. 15A except that it additionally includes the program storage unit 107 that performs data encryption. When the security device 1406a decrypts the sealed data, the encryption unit 207 seals, namely, re-encrypts the decrypted data, which has been decrypted bound with a result of an extend calculation performed on a digest of a post-update program data that is being executed by the CPU 101. And the security device 1406a outputs the sealed data together with the decrypted data.

The security device 1406 or 1406a may further include the update certificate storage unit 102 embedded therein. With this structure where the update certificate storage unit 102 is embedded in the security device 1406 or 1406a that is temper-resistant, it is possible to prevent unauthorized accesses to the update certificate, and the processes performed in steps S1104 through S1106 in the flowchart shown in FIG. 11 can be executed with higher accuracy.

Embodiment 5

The present embodiment differs from the above-described embodiments in that: (1) the update certificate includes extend values instead of digests; (2) the update certificate is generated inside the device; and (3) the sealed data having been sealed using a decryption condition for an old program structure is re-sealed using a decryption condition for a post-update program structure.

The above-mentioned feature (1) eliminates the necessity of the calculation of a pre-update extend value that is required in the above-described embodiments. Also, this eliminates the necessity of the pre-update extend value storage unit for storing the pre-update extend value.

The above-mentioned feature (2) eliminates the necessity of obtaining the update certificate from an external device.

With the above-mentioned feature (3), once the re-seal process is performed, it is not necessary to decrypt data using an old decryption condition each time the re-sealed data is used.

The following will describe the present embodiment centering on the above-mentioned features.

<Structure>

Figure 17:
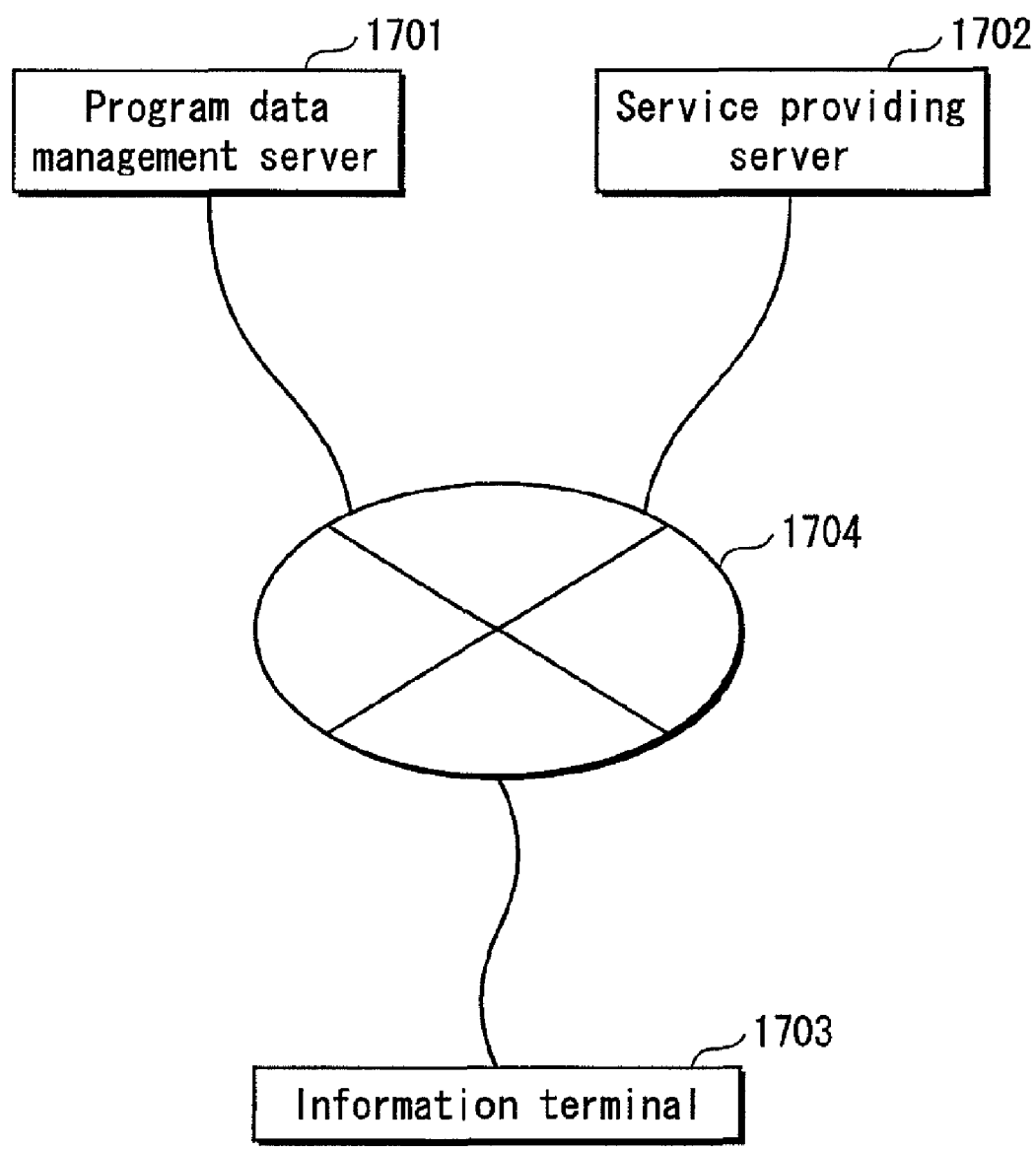
FIG. 17 shows the structure of a program update system in Embodiment 5 of the present invention.

FIG. 17 shows the structure of a program update system of the present embodiment.

The program update system includes a program data management server 1701, a service providing server 1702, and an information terminal 1703.

The program data management server 1701, the service providing server 1702, and the information terminal 1703 perform communications with each other via a network 1704.

The program data management server 1701 is a server that manages the program data executed by the information terminal 1703.

The service providing server 1702 is a server that provides services to devices that have requested services and have passed the authentication.

The information terminal 1703 is an information terminal that executes the program data while protecting the confidential data or the like that is used by the program data. The information terminal 1703 also requests a service to the service providing server 1702 and receives the service therefrom.

Note that, in the following, there will be no detailed explanation about how the information transferred by communications among the program data management server 1701, the service providing server 1702, and the information terminal 1703 should be protected. However, it would be natural to protect such information by encrypting and decrypting the same using a known encryption method. Also, an authentication may be conducted before a communication between devices is performed, and the communication may be performed only after the authentication results in a success.

<Program Data Management Server 1701>

The program data management server 1701 is specifically a computer system that includes a microprocessor, ROM, RAM, a hard disk unit, a display unit, a keyboard, a mouse and the like. A computer program is stored in the ROM or the hard disk unit. The program data management server 1701 achieve its functions as the microprocessor operates in accordance with the computer program having been read onto the RAM.

Figures 18, 19:
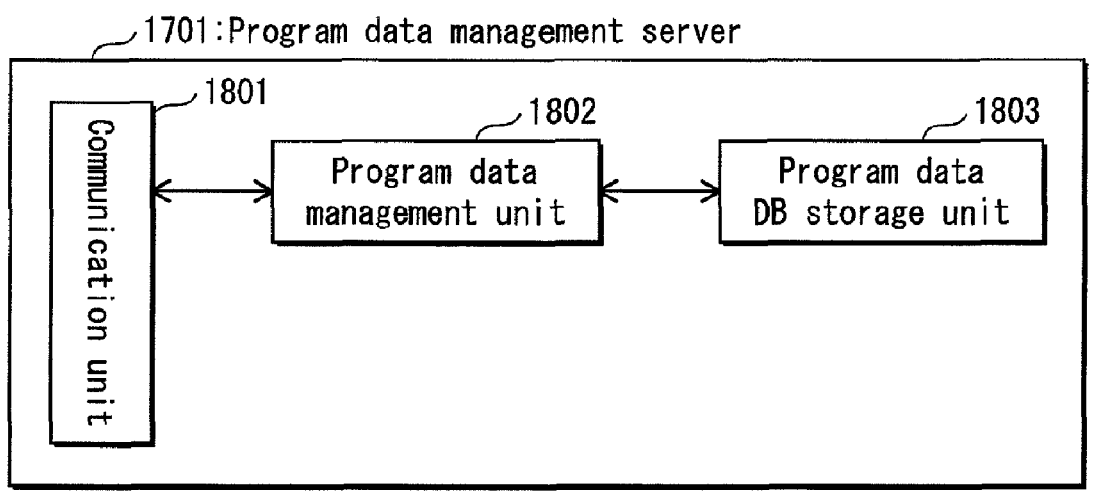
FIG. 18 shows the structure of the program data management server in Embodiment 5 of the present invention.
FIG. 19 shows an example of the program data DB in Embodiment 5 of the present invention.

FIG. 18 shows the structure of the program data management server 1701.

The program data management server 1701 includes a communication unit 1801, a program data management unit 1802, and a program data DB storage unit 1803.

The communication unit 1801 performs communication with the service providing server 1702 and the information terminal 1703 via the network 1704.

The program data DB storage unit 1803 is a storage device, such as a hard disk or a large-capacity memory, that stores a program data DB (database).

FIG. 19 shows an example of the program data DB.

The program data DB stores, for each program data such as BIOS, OS, or application program, information indicating the program data, program data ID information, and program data version in association with each other.

The program data ID information is identification information for identifying the program data.

The program data version indicates a version number of program data.

In the program data DB shown in FIG. 19 indicates, as one example, that a movie player whose program data ID information and program data version are respectively "0001" and "v1.52" is recorded.

The program data management unit 1802 manages the program data stored in the program data DB storage unit 1803.

When the program data stored in the program data DB is updated by, for example, the developer, the program data after the update, the program data ID information of the program data after the update, and the data version of the program data after the update are transmitted to the information terminal 1703 from the communication unit 1801.

It is presumed, unless otherwise specified, that the communication unit 1801 of the program data management server 1701 performs each communication between the program data management server 1701 and other devices, even when there is no explicit recitation to the effect such as "the communication unit 1801 is used to perform a communication".

Also, when the program data stored in the program data DB is updated as described above, the program data management unit 1802 transmits Program data configuration ID information and an extend value to the service providing server 1702, where the Program data configuration ID information identifies the configuration of the program data in the information terminal 1703, and the extend value is obtained by accumulating a digest of the post-update program data in the information terminal 1703, a digest of the BIOS, a digest of the OS, and digests of application programs. Note that the "configuration of the program data" means the whole or a part of the BIOS, OS, and application programs and the like that run in the information terminal 1703.

<Service Providing Server 1702>

The service providing server 1702 is specifically a computer system that includes a microprocessor, ROM, RAM, a hard disk unit, a display unit, a keyboard, a mouse and the like. A computer program is stored in the ROM or the hard disk unit. The service providing server 1702 achieve its functions as the microprocessor operates in accordance with the computer program having been read onto the RAM.

FIG. 18 shows the structure of the service providing server 1702.

The service providing server 1702 includes a communication unit 2001, a data management unit 2002, a reference value DB storage unit 2003, and a content storage unit 2004.

The communication unit 2001 performs communication with the program data management server 1701 and the information terminal 1703 via the network 1704.

The reference value DB storage unit 2003 is a storage device, such as a hard disk or a large-capacity memory, that stores a reference value DB (database).

Figures 20, 21:
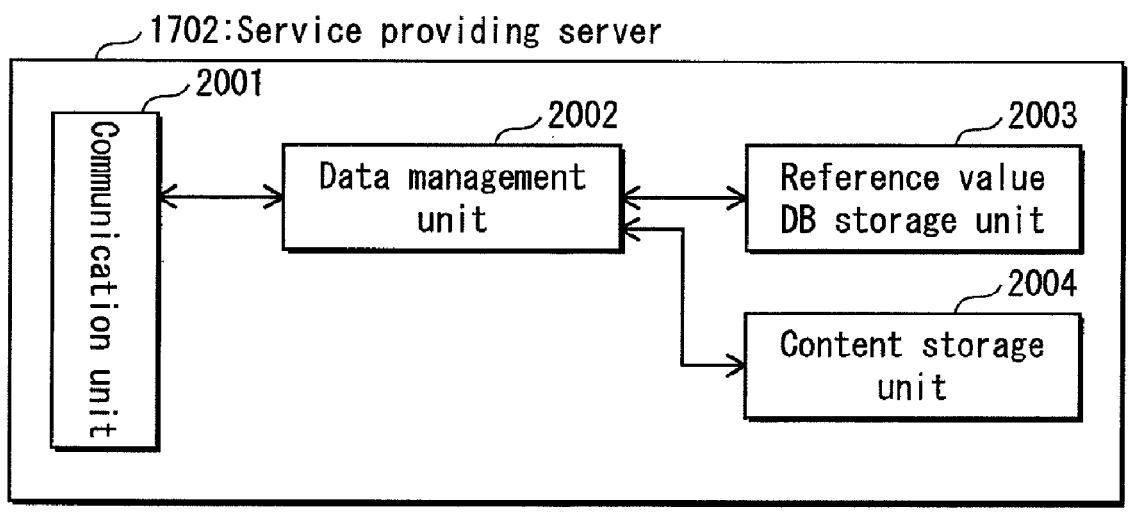
FIG. 20 shows the structure of the service providing server in Embodiment 5 of the present invention.
FIG. 21 shows an example of the reference value DB in Embodiment 5 of the present invention.

FIG. 21 shows an example of the reference value DB.

The reference value DB stores the program data configuration ID information and the reference values in association with each other, where the program data configuration ID information identifies the configuration of the program data in the information terminal that requests services.

Note that the reference value stored in the reference value DB should be the same as the extend value of the program data in the information terminal. This will be explained later.

The content storage unit 2004 is a storage device, such as a hard disk or a large-capacity memory, that stores contents and contents identifiers thereof in association with each other, where the contents are to be distributed by a content distribution service which is an example of service to be provided.

The data management unit 2002 receives, from the information terminal 1703 via the communication unit 2001, the program data configuration ID information that identifies the configuration of the program data in the information terminal that requests services, the extend value for the program data configuration, and the content identifier of the content that is requested to be distributed as the service.

It is presumed, unless otherwise specified, that the communication unit 2001 of the service providing server 1702 performs each communication between the service providing server 1702 and other devices, even when there is no explicit recitation to the effect such as "the communication unit 2001 is used to perform a communication".

The data management unit 2002 reads out a reference value corresponding to a received piece of program ID information from the reference value DB, and compares it with the extend value.

When the reference value matches the extend value, the data management unit 2002 reads out a content identified by the content identifier from the content storage unit 2004, and transmits the read-out content to the information terminal 1703.

When the reference value does not match the extend value, the data management unit 2002 transmits error information to the information terminal 1703, where the error information indicates that the service cannot be provided.

The data management unit 2002 also performs authentication of the program data management server 1701 using a known authentication method. When the authentication results in a success and the program data configuration ID information and extend value are received from the program data management server 1701, the data management unit 2002 replaces the reference value in the reference value DB, which corresponds to the program data configuration ID information having the same value as the received program data configuration ID information, with the received extend value.

<Information Terminal 1703>

The information terminal 1703 is specifically a computer system that includes a microprocessor, ROM, RAM, a hard disk unit, a display unit, a keyboard, a mouse and the like. A computer program is stored in the ROM or the hard disk unit. The information terminal 1703 achieve its functions as the microprocessor operates in accordance with the computer program having been read onto the RAM.

Figure 22:
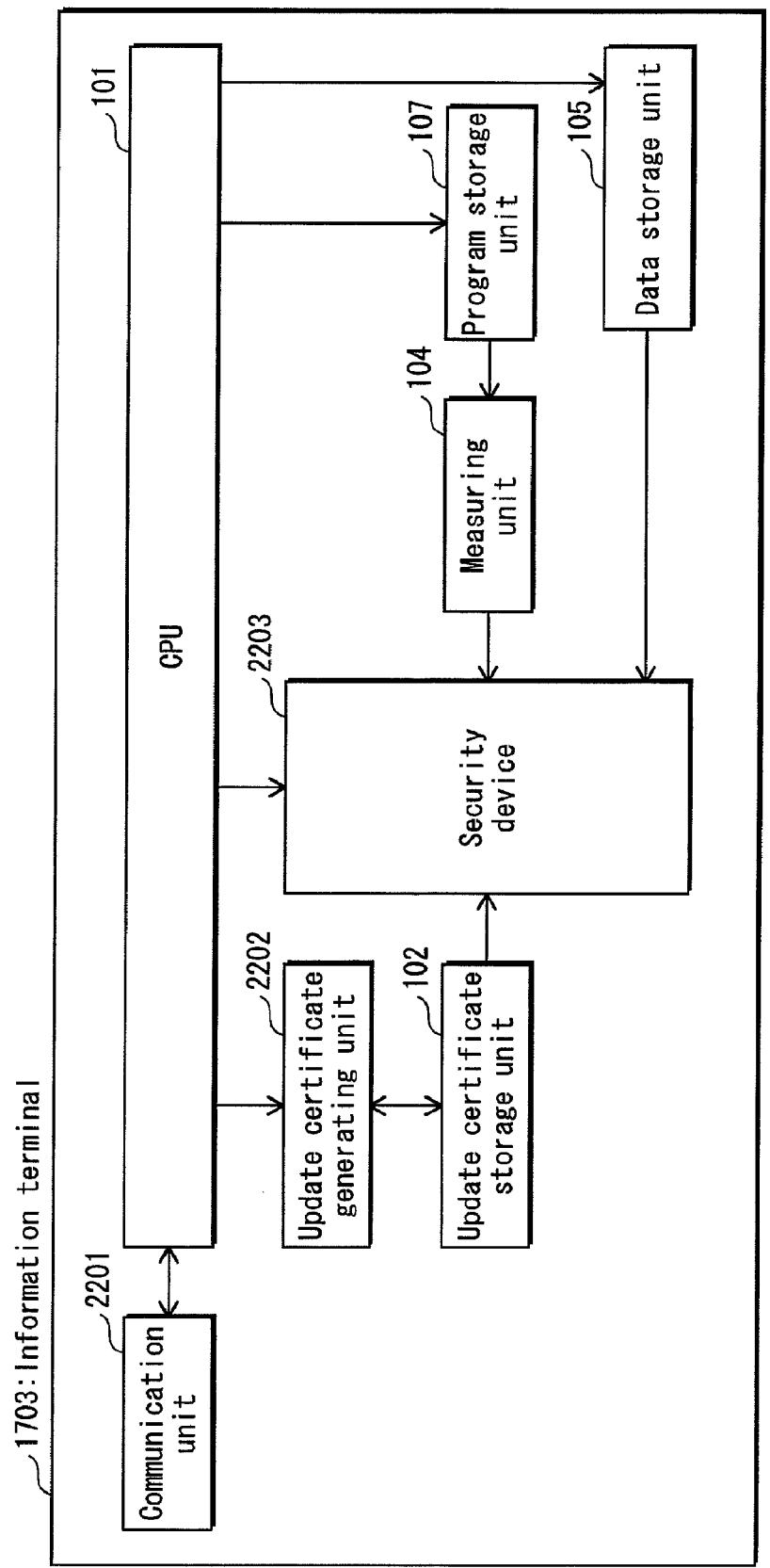
FIG. 22 is a block diagram showing the structure of the information terminal in Embodiment 5 of the present invention.

FIG. 22 is a block diagram showing the structure of the information terminal 1703.

The information terminal 1703 includes the CPU 101, the update certificate storage unit 102, the measuring unit 104, the data storage unit 105, the program storage unit 107, a communication unit 2201, an update certificate generating unit 2202, and a security device 2203.

Of these, the structural elements having the same reference numbers as the structural elements in the above-described embodiments have the same functions and the like, and description thereof is omitted.

<Communication Unit 2201>

The communication unit 2201 is a network communication device that performs communications with the program data management server 1701, the service providing server 1702 and other external devices via the network 1704.

It is presumed, unless otherwise specified, that the communication unit 2201 of the information terminal 1703 performs each communication between the information terminal 1703 and other devices, even when there is no explicit recitation to the effect such as "the communication unit 2201 is used to perform a communication".

<Update Certificate Generating Unit 2202>

The update certificate generating unit 2202 is a device for generating the update certificate.

In the following, first, the contents of the update certificate to be generated in the present embodiment will be explained, and then the process of generating the update certificate will be explained.

FIG. 24A shows the contents of an update certificate 2401 which is an example of the update certificate in the present embodiment.

The update certificate 2401 includes program data configuration ID information, new configuration version, new configuration extend value, old configuration version, old configuration extend value, and provider ID information, and is attached with a signature by the provider of the update certificate. Different from Embodiments 1-4, the update certificate 2401 of the present embodiment is issued to certify the configuration of the program data. Here, the "configuration of the program data" means the whole or a part of the BIOS, OS, and application programs and the like that run in the information terminal 1703. Different from the update certificates described in Embodiments 1-4 that include pre-update and post-update digests for each program data, the update certificate 2401 of the present embodiment includes extend values before and after the update of the program data. For this reason, the update certificate 2401 is issued for each of the whole or a part of the BIOS, OS, and application programs and the like that correspond to the extend values.

The program data configuration ID information is identification information for identifying the configuration of the program data that run in the information terminal 1703, such as the BIOS, OS, and application programs, whose updates are to be certified by the update certificate.

The new configuration version is a list of ID information and version numbers of all the program data included in the newest program data configuration at the point in time when the update certificate is generated.

The new configuration extend value is an extend value that includes the digest of the newest program data.

In the present embodiment, the new configuration extend value is a value obtained by accumulating a digest of the newest program data, a digest of the BIOS, a digest of the OS, and digests of application programs.

The old configuration version is a list of ID information and version numbers of all the program data included in the program data configuration before the update-target program data is updated.

The old configuration extend value is an extend value that includes the digest of the update-target program data before the update.

In the present embodiment, the old configuration extend value is a value obtained by accumulating a digest of the update-target program data before the update, a digest of the BIOS, a digest of the OS, and digests of application programs.

The provider ID information is identification information for identifying the provider of the update certificate in concern. In the present example case, the information terminal 1703 is the provider, and thus the provider ID information identifies the provider as the information terminal 1703.

The signature by the provider is a signature applied by the provider of the update certificate to certify the contents of the update certificate. The signature is generated by using a private key unique to the provider. In the present example case, the information terminal 1703 is the provider, and thus the signature by the provider is generated by using a private key unique to the information terminal 1703.

Next, the process in which the update certificate generating unit 2202 generates the update certificate will be described.

Figure 25:
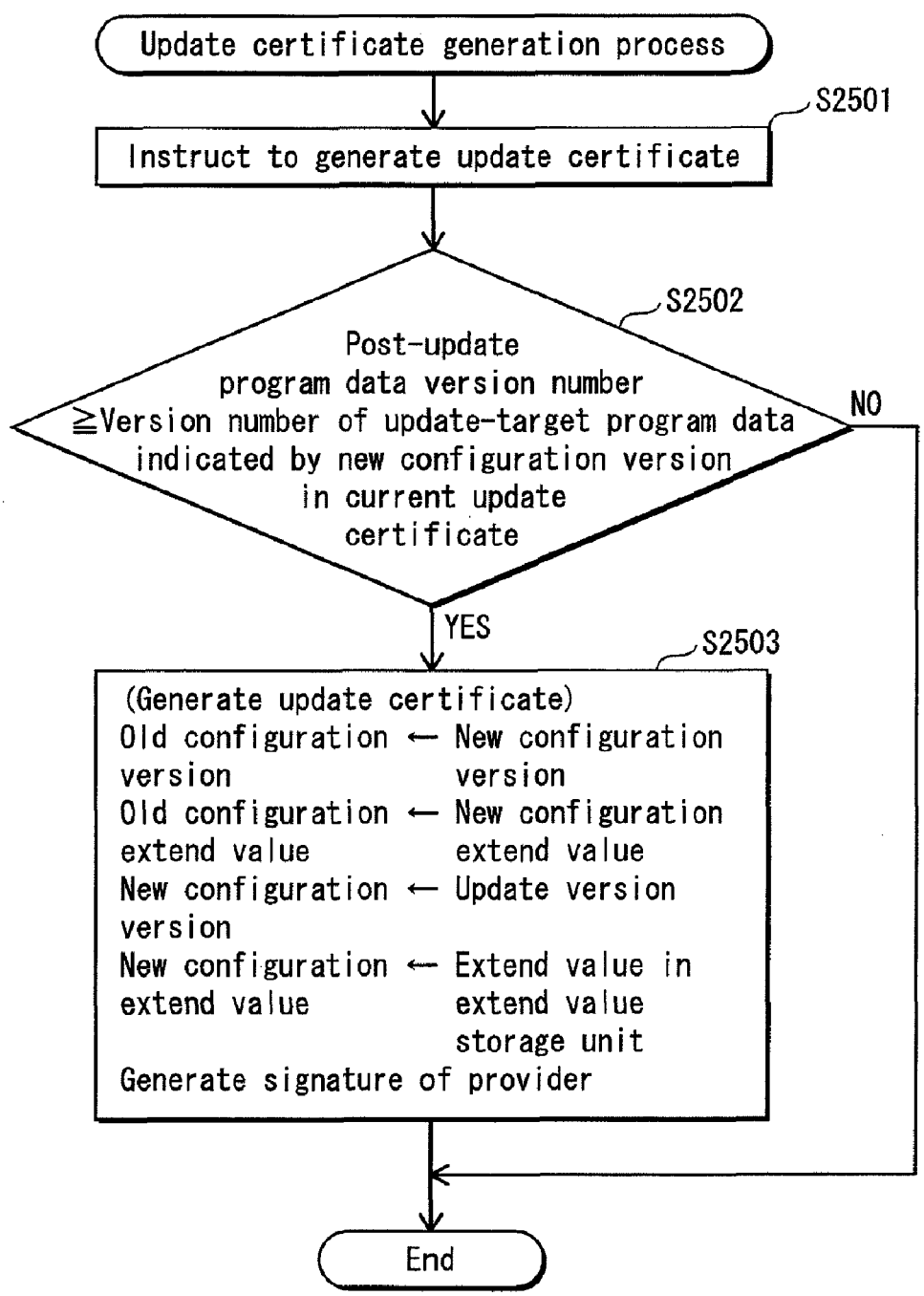
FIG. 25 is a flowchart of the update certificate generation process in Embodiment 5 of the present invention.

FIG. 25 is a flowchart of the update certificate generation process.

The update certificate generating unit 2202 receives from the CPU 101 an update certificate generation instruction that includes ID information and version numbers of the update-target program data (step S2501).

Here, the ID information of the update-target program data and the version numbers of the post-update program data are those that are transmitted from the program data management server 1701 to the information terminal 1703, and are obtained by the CPU 101 after the authenticity of the program data management server 1701 is confirmed by using a known authentication method.

The update certificate generating unit 2202 then reads out an update certificate (hereinafter referred to as "current update certificate") from the update certificate storage unit 102, and judges whether the version number of the obtained post-update program data is equal to or larger than the version number of the update-target program data indicated by the new configuration version in the current update certificate (step S2502). When the judgment results in the affirmative (YES in step S2502), the update certificate generating unit 2202 generates a new update certificate (hereinafter referred to as "new update certificate") (step S2503).

Here, the old configuration version of the new update certificate is stored with the new configuration version of the current update certificate.

Also, the old configuration extend value of the new update certificate is stored with the new configuration extend value of the current update certificate.

Further, the new configuration version of the new update certificate is stored with the version number of the obtained post-update program data, which replaces, by the update, the version number of the update-target program data included in the new configuration version of the current update certificate.

The new configuration extend value of the new update certificate is stored with the extend value stored in the extend value storage unit 202, namely, the extend value including the digest of the newest program data.

The program data configuration ID information of the new update certificate is stored with the program data configuration ID information of the current update certificate.

The provider ID information of the new update certificate is stored with the provider ID information of the current update certificate.

Further, a signature by the provider of the update certificate, for certifying the contents of the update certificate (the program data configuration ID information, new configuration version, new configuration extend value, old configuration version, old configuration extend value, and provider ID information), is generated. In the present example case, a signature by the information terminal is generated.

The update certificate generating unit 2202 updates the update certificate by overwriting the old update certificate stored in the update certificate storage unit 102 with the new update certificate generated as described above.

<Security Device 2203>

The security device 2203 has the re-seal function in addition to the functions of the security device 106 that has already been described.

Figure 23:
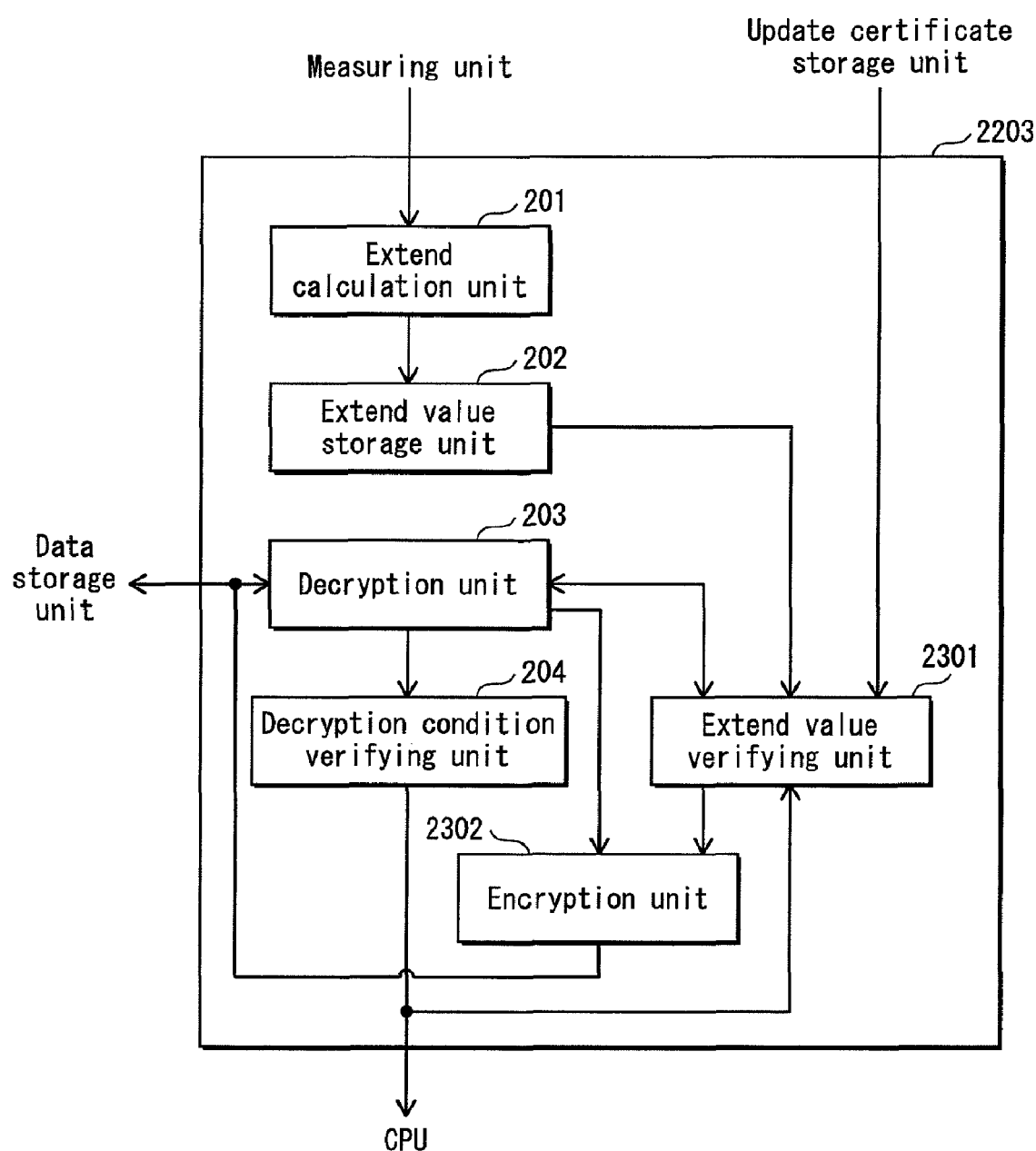
FIG. 23 is a block diagram showing the structure of the security device in Embodiment 5 of the present invention.

FIG. 23 is a block diagram showing the structure of the security device.

The security device 2203 includes an extend calculation unit 201, an extend value storage unit 202, a decryption unit 203, a decryption condition verifying unit 204, an extend value verifying unit 2301, and an encryption unit 2302.

Of these, the structural elements that are the same as those of the above-described embodiments have the same reference numbers, and description thereof is omitted.

The encryption unit 2302 holds an encryption key, and encrypts data using the encryption key.

It is presumed here that the decryption unit 203 holds a decryption key to be used for decrypting the encrypted data encrypted with use of the encryption key.

The extend value verifying unit 2301 controls the re-seal process.

Figure 26:
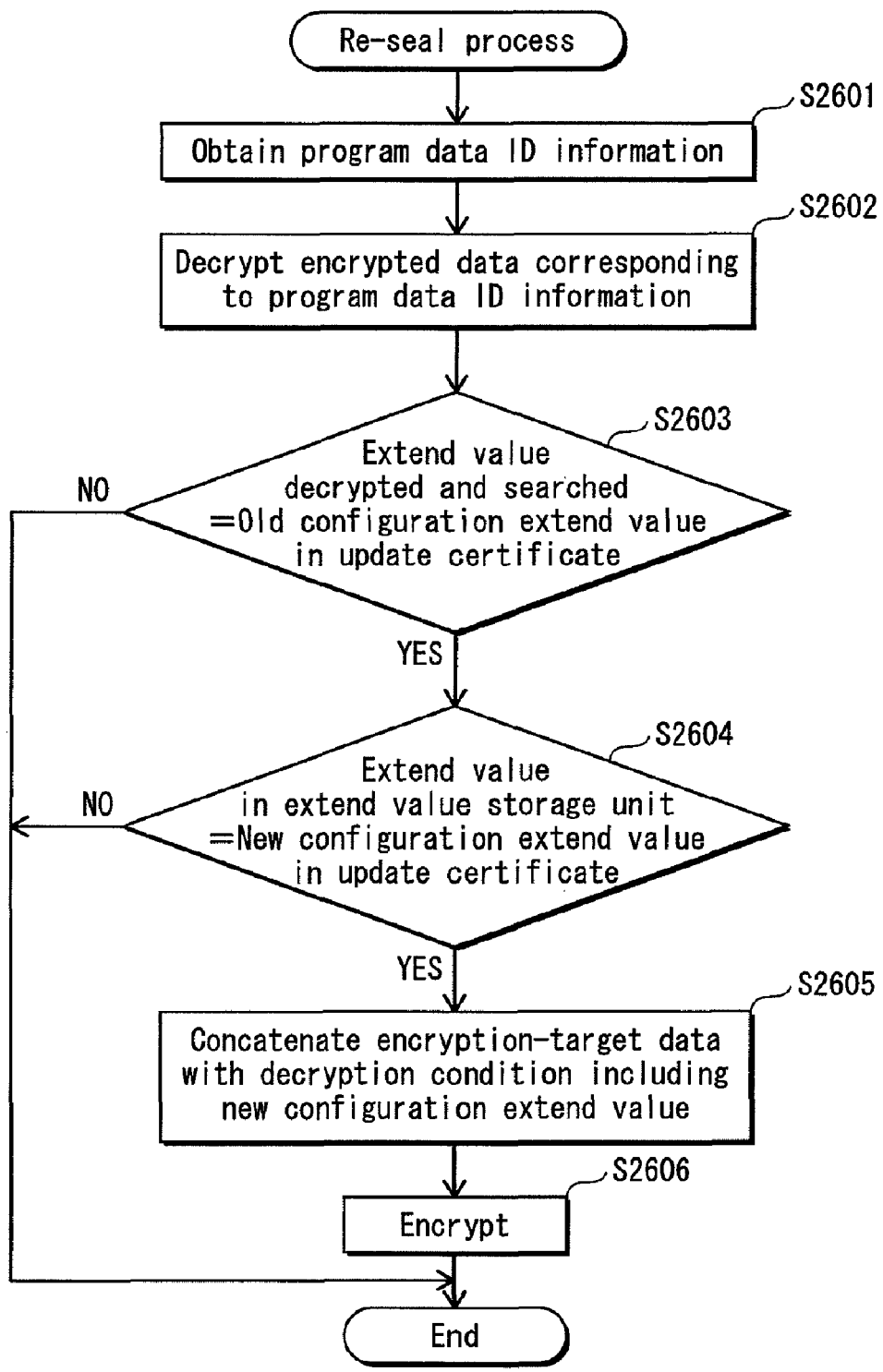
FIG. 26 is a flowchart of the re-seal process performed by the extend value verifying unit in Embodiment 5 of the present invention.

FIG. 26 is a flowchart of the re-seal process performed by the extend value verifying unit 2301.

The extend value verifying unit 2301 obtains, from the CPU 101, a program data update notification including the program data ID information for identifying the program data for update (step S1601).

The extend value verifying unit 2301 then reads out, from the data storage unit 105, the encrypted data that corresponds to the program data ID information included in the update notification.

The extend value verifying unit 2301 then instructs the decryption unit 203 to decrypt the encrypted data.

The decryption unit 203 decrypts the encrypted data using the decryption key (step S2602). Upon completing the decryption, the decryption unit 203 sends a decryption completion notification, and the extend value verifying unit 2301 receives the notification.

The extend value verifying unit 2301 reads out the update certificate corresponding to the program data ID information from the update certificate storage unit 102.

The extend value verifying unit 2301 judges whether or not the extend value included in the decrypted data that was decrypted by the decryption unit 203 matches the old configuration extend value included in the read-out update certificate (step S2603).

When the judgment in step S2603 results in the negative (NO in step S2603), the decrypted data should have been sealed using the new configuration extend value (the newest extend value) included in the update certificate, or should have been sealed using an extend value that is neither the new configuration extend value nor the old configuration extend value. In either case, there is no need of re-sealing, and the process is ended.

When the judgment in step S2603 results in the affirmative (YES in step S2603), the extend value verifying unit 2301 further judges whether or not the extend value stored in the extend value storage unit 202 matches the new configuration extend value stored in the update certificate (step S2604).

When the judgment in step S2604 results in the negative (NO in step S2604), the extend value verifying unit 2301 ends the process since it indicates that the program data having the post-update configuration may not be executed on the information terminal 1703, namely, the program data having the pre-update configuration may be executed, or unauthorized program data may be executed.

When the judgment in step S2604 results in the affirmative (YES in step S2604), it indicates that, although the program data has been updated, the encrypted data has been sealed using an extend value (old configuration extend value) corresponding to the pre-update program dada. In such a case, re-sealing needs to be performed. Therefore, the decryption condition in the decrypted data is replaced with the new configuration extend value in the update certificate.

Here, the encryption target becomes concatenated data that is generated by concatenating the encryption-target data with the decryption condition including the new configuration extend value in the update certificate.

The extend value verifying unit 2301 instructs the encryption unit 2302 to encrypt the concatenated data (step S2605).

The encryption unit 2302 encrypts the concatenated data using the encryption key (step S2606), and sends an encryption completion notification to the extend value verifying unit 2301.

The extend value verifying unit 2301 receives the encryption completion notification from the encryption unit 2302.

This completes the control of the re-seal process.

Note that, in the present embodiment, the CPU 101 sends a program data update notification to the security device 2203 each time it receives program data ID information for identifying the program data for update from the program data management server 1701. Accordingly, the security device 2203 executes the re-seal process onto the data that requires the re-seal process each time an update of the program data is performed.

That is to say, the re-seal process is performed onto the data that has been sealed using the old configuration extend value, at a timing immediately after an update of the program data is detected.

Accordingly, after the re-seal process, the post-update program data satisfies the decryption condition by using the new configuration extend value, and the operations that are performed in the above-described embodiments, such as the calculation of the old configuration extend value when data is to be used, and the judgment on the decryption condition by using the old configuration extend value, become unnecessary.

<Modifications>

Up to now, the present invention has been described through several embodiments thereof. However, the present invention is not limited to these embodiments, but may be modified in various ways within the scope of the present invention. The following are examples of such.

(1) The update certificate recited in Embodiment 5 is not limited to the structure shown in FIG. 24A where it includes information of two generations, such as the versions and extend values of the new configuration and old configuration, but may have the structure shown in FIG. 24B where it includes versions and extend values of a plurality of generations.

FIG. 24B shows the contents of an update certificate which includes versions of a plurality of generations and extend values corresponding to the versions.

With this structure, even if the update of the program data is performed frequently in the information terminal 1703, and, as a result, the decryption condition associated with target data includes a digest of program data of a generation that is a plurality of generations before, it is possible to satisfy the decryption condition by using an extend value included in the update certificate for the generation that is the plurality of generations before.

(2) In Embodiment 5, the update certificate is generated inside the information terminal. However, not limited to this structure, for example, the update certificate may be obtained via an external server or recording medium, as is the case with Embodiments 1 through 4. In this case, the provider ID information is identification information for identifying the external organization that generates the update certificate, and the signature to be applied to the update certificate is a signature applied by the external organization that generates the update certificate. Also, in this case, different from Embodiments 1 through 4, the update certificate to be provided includes the information shown in FIG. 24A or FIG. 24B, not the digests before and after the update. In this case, the extend value is given from outside. Thus, as in Embodiment 5, the process of calculating the pre-update extend value and the pre-update extend value storage unit for storing the pre-update extend value become unnecessary.

(3) In Embodiment 5, the update certificate generating unit 2202 generates an update certificate based on an update certificate generation instruction that includes ID information and version numbers of the update-target program data. However, the update certificate generating unit may generate an update certificate based on an update certificate generation instruction which includes update certificates of each piece of program data in Embodiments 1-4. In this case, the update certificate of each piece of program data is attached with a signature by the provider of the program data. This structure prevents an update certificate from being generated based on unauthorized program data.

(4) The above-described embodiments and modifications discloses that the update certificate stores a plurality of digests or extend values of generations from the (N−1) generation to the (N−$i$) generation are stored. However, the present invention is not limited to this structure. For example, the update certificate may store (a) a digest or an extend value of a generation specified by the user and (b) a digest or an extend value of the newest generation. This modification produces an advantageous effect in a case where the program data is updated to the newest version with a jump of two or more generations from the previous version since the user has forgotten to perform updates. In this case, sealing with use of a digest or an extend value of an intermediate generation between the updates is not performed inside the information terminal. Therefore, it has little meaning that the update certificate includes such a digest or an extend value of an intermediate generation. Accordingly, an advantageous effect can be produced rather by the structure where the update certificate includes only digests or extend values that are necessary to unseal the sealed information, which can reduce the capacity of the update certificate.

Also, in this case, the old generation of the program data may be automatically notified to the update certificate issuing organization via the network or the like, not that the user specifies the old generation. The timing when the notification is made may be when an instruction to update the program data is received. Upon receiving the notification, the issuing organization generates an update certificate that stores (a) a digest or an extend value corresponding to the generation of the received program data, and (b) a digest or an extend value of the newest generation, and transmits the generated update certificate. With this structure, the user can automatically obtain an update certificate that stores a digest or an extend value corresponding to the generation of the program data before update, without checking the generation of the program data before update.

(5) In the above-described embodiments and modifications, the data to be sealed is first associated with the extend value, and then the data is encrypted. However, the sealing method is not limited to this. For example, the data may be encrypted using, as a key, the extend value or the program data digest. That is to say, the sealing may be achieved by any method in so far the method ensures that the data is associated with the program data and that the data cannot be obtained unless a correct relationship is satisfied.

(6) In the above-described embodiments and modifications, the data to be sealed is first associated with the extend value based on the digest of the program data, and then the data is encrypted. However, the sealing method is not limited to this. For example, the data to be sealed may be associated with an extend value that is obtained by performing an extend calculation on the digest of the program data and on the digest of the event information of events that happen during the execution of the program data. Here, the event information is information of events such as results of various processes performed by the program data, data communications with other devices, data inputs from outside, and operations on the information terminal. For example, the event information is information of events such as a result that the authentication process with an external server resulted in a success, or an event that the user of the information terminal 1703 has input an appropriate password. That is to say, with this structure, the data is associated with the event information of events such as the results of various processes performed by the program data, and data inputs from outside, and the data cannot be obtained unless a predetermined, correct event happens.

(7) In the above-described embodiments and modifications, the data to be sealed is first associated with the extend value, and then the data is encrypted. However, the sealing method is not limited to this. For example, the extend value may be associated with a private key that is used in the encryption process in the information terminal. In this case, the sealed private key is decrypted inside the security device in the unseal process, and the plaintext of the private key is not exposed to outside the security device.

In this case, a process using the private key decrypted in the security device can be performed only when the extend value stored in the extend value storage unit 202 matches the extend value associated by the sealing. This makes it possible to perform the encryption/decryption process and the signature process within the security device.

Also, the information to be sealed is not limited to the private key, but may be any key, such as a common key in the common key cryptography, in so far as the key is used in the encryption process performed in the information terminal.

(8) In the above-described embodiments and modifications, when the reference value DB 1612 of the service providing server 1610 has not been updated, the information terminal 900 receives an error message from the service providing server 1610 and sends the value stored in the pre-update extend value storage unit 206 to the service providing server 1610. However, not limited to such an implementation, the information terminal 900 may send the value stored in the extend value storage unit 202 and the value stored in the pre-update extend value storage unit 206 at the same time to the service providing server 1610, by expecting the case where the reference value DB 1612 of the service providing server 1610 is not updated. In this case, the service providing server 1610 provides an information service when any of the received values matches a predetermined value.

(9) Each device described above is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and each device to achieve its functions. The computer program mentioned above is composed of a plurality of instruction codes which each instructs the computer to achieve a predetermined function.

Note that each device described above may not necessarily be a computer system that includes all of the microprocessor, ROM, RAM, hard disk unit, display unit, keyboard, mouse and the like, but may be a computer system that includes part of these.

(10) Part or all of the structural elements constituting the devices described in the embodiment above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions. Each part of structural elements constituting each of the above-described devices may be achieved on one chip, or part or all thereof may be achieved on one chip.

Although the term LSI is used here, it may be called IC, LSI, super LSI, ultra LSI or the like, depending on the level of integration.

The method for achieving the integrated circuits is not limited to the LSI, but the integrated circuits may be achieved by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(11) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(12) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, by transferring the program or the digital signal via the recording medium, or by transferring the program or the digital signal via the network or the like, the program or the digital signal may be executed by another independent computer system.

(13) The present invention may be any combination of the above-described embodiment and modifications.

INDUSTRIAL APPLICABILITY

The present invention enables a security device loaded in an information terminal of the present invention to be loaded into another device so that the device has the same structure as the information terminal. This produces an advantageous effect that, without returning updated program data to the state before update, the sealed data can be decrypted and information service can be received from a service providing server that authenticates the program data executed by the CPU. The present invention is useful for information communication devices and home electric appliances that update program data, such as a personal computer, mobile telephone, audio player, television receiver, and video recorder.

The invention claimed is:

1. An information terminal for executing a program, comprising:
    an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;
    a holding unit operable to hold data and a past characteristic value in association with each other, the past characteristic value being extracted from a past program and indicating a characteristic of the past program, the past program being a program that used the data in past;
    a judging unit operable to judge, using the new characteristic value, whether or not a current program matches the new program, the current program being a program that is currently executed in the information terminal; and
    a permission unit operable to judge, in accordance with the old characteristic value and the past characteristic value, whether or not the data can be used when the judging unit judges that the current program matches the new program, and permit the current program to use the data when judging that the data can be used,
    wherein the new characteristic value is a digest of the new program,
    wherein the judging unit includes:
        a digest generating sub-unit operable to generate a digest of the current program; and
        a determining sub-unit operable to determine that the current program matches the new program when the digest of the current program matches the digest of the new program,
    wherein the old characteristic value is a digest of the old program,
    wherein the past characteristic value is a digest of the past program,
    wherein the data is associated with a use condition value that is a value based on the digest of the past program,
    wherein the digest generating sub-unit generates a digest of each of one or more programs that were executed in a predetermined order before the current program is executed,
    wherein the permission unit includes:
        an extend value generating sub-unit operable to generate a pre-update extend value by performing an extend calculation on each digest of the one or more programs and on the digest of the old program in the update certificate;
an extend value judging sub-unit operable to judge whether or not the use condition value matches the pre-update extend value; and
a use permission sub-unit operable to permit the current program to use the data when the extend value judging sub-unit judges that the use condition value matches the pre-update extend value,
wherein the extend value generating sub-unit (i) generates the pre-update extend value when the judging unit judges that the current program matches the new program, and (ii) generates a current extend value by performing an extend calculation on each digest of the one or more programs and on the digest of the current program when the judging unit judges that the current program does not match the new program,
wherein the extend value judging sub-unit (i) judges whether or not the use condition value matches the pre-update extend value when the judging unit judges that the current program matches the new program, and (ii) judges whether or not the use condition value matches the current extend value when the judging unit judges that the current program does not match the new program, and
wherein the use permission sub-unit permits the current program to use the data when the extend value judging sub-unit judges that the use condition value matches either the pre-update extend value or the current extend value.

2. An information terminal for executing a program, comprising:
an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;
a holding unit operable to hold data and a past characteristic value in association with each other, the past characteristic value being extracted from a past program and indicating a characteristic of the past program, the past program being a program that used the data in past;
a judging unit operable to judge, using the new characteristic value, whether or not a current program matches the new program, the current program being a program that is currently executed in the information terminal; and
a permission unit operable to judge, in accordance with the old characteristic value and the past characteristic value, whether or not the data can be used when the judging unit judges that the current program matches the new program, and permit the current program to use the data when judging that the data can be used,
wherein the new characteristic value is a digest of the new program,
wherein the judging unit includes:
a digest generating sub-unit operable to generate a digest of the current program; and
a determining sub-unit operable to determine that the current program matches the new program when the digest of the current program matches the digest of the new program,
wherein the old characteristic value is a digest of the old program,
wherein the past characteristic value is a digest of the past program,
wherein the data is associated with a use condition value that is a value based on the digest of the past program,
wherein the digest generating sub-unit generates a digest of each of one or more programs that were executed in a predetermined order before the current program is executed,
wherein the permission unit includes:
an extend value generating sub-unit operable to generate a pre-update extend value by performing an extend calculation on each digest of the one or more programs and on the digest of the old program in the update certificate;
an extend value judging sub-unit operable to judge whether or not the use condition value matches the pre-update extend value; and
a use permission sub-unit operable to permit the current program to use the data when the extend value judging sub-unit judges that the use condition value matches the pre-update extend value,
wherein the extend value generating sub-unit generates the pre-update extend value, and generates a current extend value by performing an extend calculation on each digest of the one or more programs and on the digest of the current program, and
wherein the use permission sub-unit judges whether or not the use condition value matches either the pre-update extend value or the current extend value, and permits the current program to use the data when the use permission sub-unit judges that the use condition value matches either the pre-update extend value or the current extend value.

3. An information terminal for executing a program, comprising:
an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;
a holding unit operable to hold data and a past characteristic value in association with each other, the past characteristic value being extracted from a past program and indicating a characteristic of the past program, the past program being a program that used the data in past;
a judging unit operable to judge, using the new characteristic value, whether or not a current program matches the new program, the current program being a program that is currently executed in the information terminal; and
a permission unit operable to judge, in accordance with the old characteristic value and the past characteristic value, whether or not the data can be used when the judging unit judges that the current program matches the new program, and permit the current program to use the data when judging that the data can be used,
wherein the new characteristic value is a digest of the new program,
wherein the judging unit includes:
a digest generating sub-unit operable to generate a digest of the current program; and
a determining sub-unit operable to determine that the current program matches the new program when the digest of the current program matches the digest of the new program, wherein the old characteristic value is a digest of the old program,
wherein the past characteristic value is a digest of the past program,
wherein the data is associated with a use condition value that is a value based on the digest of the past program,
wherein the digest generating sub-unit generates a digest of each of one or more programs that were executed in a predetermined order before the current program is executed,
wherein the permission unit includes:
　an extend value generating sub-unit operable to generate a pre-update extend value by performing an extend calculation on each digest of the one or more programs and on the digest of the old program in the update certificate;
　an extend value judging sub-unit operable to judge whether or not the use condition value matches the pre-update extend value; and
　a use permission sub-unit operable to permit the current program to use the data when the extend value judging sub-unit judges that the use condition value matches the pre-update extend value,
wherein the extend value generating sub-unit further generates a current extend value by performing an extend calculation on each digest of the one or more programs and on the digest of the current program, and
wherein when the permission unit judges that the data can be used, the permission unit further updates the use condition value, which is associated with the data, to the current extend value.

4. An information terminal for executing a program, comprising:
　an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;
　a holding unit operable to hold data and a past characteristic value in association with each other, the past characteristic value being extracted from a past program and indicating a characteristic of the past program, the past program being a program that used the data in past;
　a judging unit operable to judge, using the new characteristic value, whether or not a current program matches the new program, the current program being a program that is currently executed in the information terminal; and
　a permission unit operable to judge, in accordance with the old characteristic value and the past characteristic value, whether or not the data can be used when the judging unit judges that the current program matches the new program, and permit the current program to use the data when judging that the data can be used,
wherein the new characteristic value is a digest of the new program,
wherein the judging unit includes:
　a digest generating sub-unit operable to generate a digest of the current program; and
　a determining sub-unit operable to determine that the current program matches the new program when the digest of the current program matches the digest of the new program,
wherein the old characteristic value is a digest of the old program,
wherein the past characteristic value is a digest of the past program,
wherein the data is associated with a use condition value that is a value based on the digest of the past program,
wherein the digest generating sub-unit generates a digest of each of one or more programs that were executed in a predetermined order before the current program is executed,
wherein the permission unit includes:
　an extend value generating sub-unit operable to generate a pre-update extend value by performing an extend calculation on each digest of the one or more programs and on the digest of the old program in the update certificate;
　an extend value judging sub-unit operable to judge whether or not the use condition value matches the pre-update extend value; and
　a use permission sub-unit operable to permit the current program to use the data when the extend value judging sub-unit judges that the use condition value matches the pre-update extend value,
wherein the data and the use condition value have been encrypted before being held by the information terminal, and
wherein the permission unit further includes:
　a decryption sub-unit operable to decrypt the data and the use condition value before the judgment by the use permission sub-unit; and
　an encryption sub-unit operable to encrypt the data and the use condition value after the current program ends a use of the data.

5. An information terminal for executing a program, comprising:
　an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;
　a holding unit operable to hold data and a past characteristic value in association with each other, the past characteristic value being extracted from a past program and indicating a characteristic of the past program, the past program being a program that used the data in past;
　a judging unit operable to judge, using the new characteristic value, whether or not a current program matches the new program, the current program being a program that is currently executed in the information terminal; and
　a permission unit operable to judge, in accordance with the old characteristic value and the past characteristic value, whether or not the data can be used when the judging unit judges that the current program matches the new program, and permit the current program to use the data when judging that the data can be used,
wherein the new characteristic value is a post-update extend value that is generated by performing an extend calculation on the digest of the new program and on each digest of one or more programs that are executed in a predetermined order before the current program is executed in the information terminal,
wherein the judging unit includes:
　a digest generating sub-unit operable to generate a digest of each of one or more programs that were executed in the predetermined order before the current program is executed, and generate a digest of the current program;

an extend value generating sub-unit operable to generate a current extend value by performing an extend calculation on each digest generated by the digest generating sub-unit; and a determining sub-unit operable to determine that the current program matches the new program when the post-update extend value matches the current extend value, wherein the old characteristic value is a pre-update extend value that is generated by performing an extend calculation on each digest of one or more programs that are executed in a predetermined order before the current program is executed in the information terminal, and on the digest of the old program, wherein the past characteristic value is a past-update extend value that is generated by performing an extend calculation on each digest of the one or more programs that are executed in the predetermined order before the current program is executed in the information terminal, and on the digest of the past program, wherein the data is associated with a use condition value that is a value equivalent with the past characteristic value, and wherein the permission unit includes:

an extend value judging sub-unit operable to, when the judging unit judges that the current program matches the new program, judge whether or not the use condition value matches the pre-update extend value; and a use permission sub-unit operable to permit the current program, which is currently executed, to use the data when the extend value judging sub-unit judges that the use condition value matches the pre-update extend value.

6. The information terminal of claim 5, wherein the permission unit further includes a re-seal sub-unit operable to update the use condition value, which is associated with the data, to the current extend value generated by the extend value generating sub-unit when the use permission sub-unit permits the current program to use the data.

7. An information terminal for executing a program, comprising:

an update certificate obtaining unit operable to obtain an update certificate including an old characteristic value and a new characteristic value, the old characteristic value being extracted from an old program and indicating a characteristic of the old program, the new characteristic value being extracted from a new program that is obtained by updating the old program and indicating a characteristic of the new program;

a holding unit operable to hold data and a past characteristic value in association with each other, the past characteristic value being extracted from a past program and indicating a characteristic of the past program, the past program being a program that used the data in past;

a judging unit operable to judge, using the new characteristic value, whether or not a current program matches the new program, the current program being a program that is currently executed in the information terminal; and a permission unit operable to judge, in accordance with the old characteristic value and the past characteristic value, whether or not the data can be used when the judging unit judges that the current program matches the new program, and permit the current program to use the data when judging that the data can be used, wherein the information terminal is used together with a service providing device that judges whether to provide service based on an authentication value, the authentication value being a characteristic value indicating a characteristic of a program, wherein the service providing device includes:

a storage unit storing a reference value being a characteristic value indicating a characteristic of a program;

a receiving unit operable to receive an authentication value from the information terminal; and a providing unit operable to provide a service to the information terminal when the authentication value matches the reference value, and wherein the information terminal further comprises a transmission unit operable to transmit, to the service providing device, an authentication value that indicates a characteristic of the current program, and when the service is not provided as a response to the transmission of the authentication value, transmit, to the service providing device, an authentication value that indicates a characteristic of the old program.

* * * * *